United States Patent [19]

Moffett et al.

[11] 3,766,322

[45] Oct. 16, 1973

[54] DATA SWITCHING EXCHANGES

[75] Inventors: Robin Henry Moffett, Maidenhead; Peter William Smith, Hillingdon, both of England; Christopher Charles Vonwiller, New South Wales, Australia

[73] Assignee: Plessy Handel und Investments A.G., Gartenstrasse, Switzerland

[22] Filed: Nov. 18, 1971

[21] Appl. No.: 199,956

[30] Foreign Application Priority Data

Nov. 21, 1970 Great Britain .................. 55,486/70

[52] U.S. Cl. ........................ 179/15 BV, 179/15 AT

[51] Int. Cl. .............................................. H04j 3/00

[58] Field of Search ................... 179/15 BV, 15 AT, 179/18 D, 18 EA, 18 J, 15 AF; 178/50

[56] References Cited

UNITED STATES PATENTS

| | | | |
|---|---|---|---|
| 3,328,534 | 6/1967 | Murphy | 179/18 EA |
| 3,226,488 | 12/1965 | Sikorski | 179/18 FF |
| 3,109,897 | 11/1963 | Carbrey | 179/15 AF |
| 3,597,548 | 8/1971 | Drinnan | 179/15 AT |
| 3,403,383 | 9/1968 | Kienzle | 179/15 AT |
| 3,535,450 | 10/1970 | Vollmeyer | 178/50 |

*Primary Examiner*—Kathleen H. Claffy
*Assistant Examiner*—David L. Stewart
*Attorney*—Samuel Scrivener, Jr. et al.

[57] ABSTRACT

A data-switching exchange is provided which serves on a two-way transmission basis a plurality of data-rate categories of subscribers' stations in which the switching area includes incoming and outgoing highways arranged in groups with one incoming group comprising a plurality of highways and one outgoing group comprising the same number of highways being appropriate to each category of subscribers' stations. In respect of a particular category of subscribers' stations each incoming highway and a corresponding outgoing highway handle information in respect of the same plurality of subscribers' stations on a character-interleaved time-division multiplexed basis in the same synchronous multiplex time-slot-appearance order and circuit switched interconnected between stations of the particular data-rate category is provided by the utilisation of one of a particular set of so-called cords having character time-slot-appearance changing capabilities and the operation of appropriate crosspoints of two arrays. The first of these arrays is arranged to selectively connect any one of said group of incoming highways to the input path of any of the set of cords and the second of the arrays is arranged to selectively connect the output path of any one of the set of cords to any one of the group of outgoing highways.

13 Claims, 13 Drawing Figures

Figure 1:
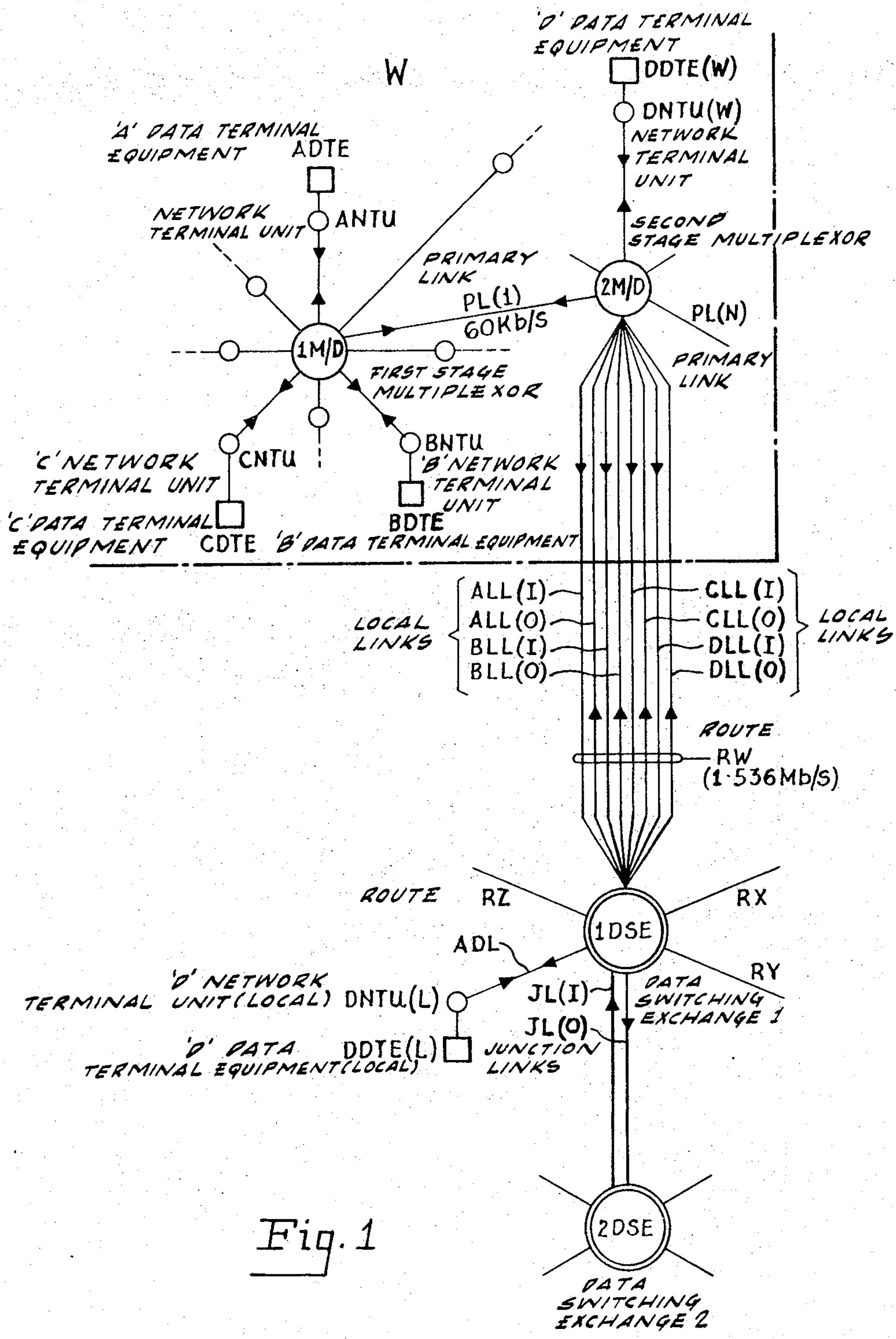

United States Patent [19]
Moffett et al.
[11] 3,766,322
[45] Oct. 16, 1973
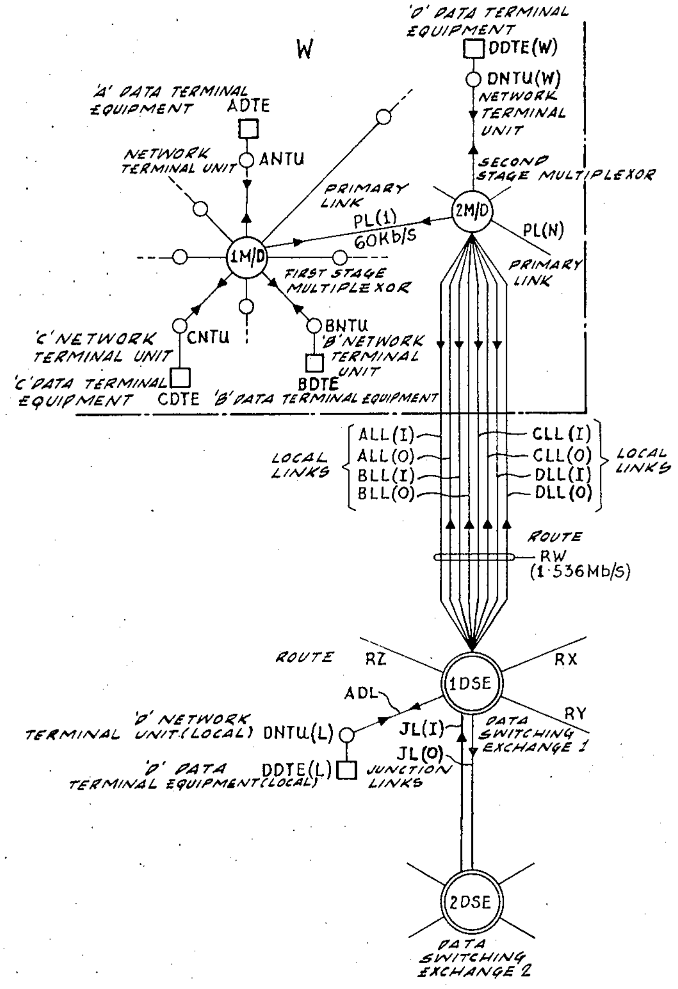

Patented Oct. 16, 1973 3,766,322

10 Sheets-Sheet 1

Patented Oct. 16, 1973 3,766,322

10 Sheets-Sheet 5

DATA SWITCHING EXCHANGES

The present invention relates to data-switching exchanges for use in a national or like data-switching network.

Many factors, economic and operational, must be taken into account in the design of a national data-switching network, and it is contended that the best form of network should be based on, (a) the use of data-switching exchanges incorporating t.d.m. (time-division-multiplex) techniques and providing an adequate range of services in respect of subscribers stations collectively operating over a range of data speeds embracing those already employed in, or contemplated for use in, existing public and private data-switching networks, (b) the concept that the whole network is synchronously operative, and (c) the use in each exchange of a central control equipment employing high-speed data-processing and manipulation techniques of the general kind which have proved their reliability in the field of digital computers.

In a highly-developed industrial society such as Great Britain much activity has been taking place over an extended period in the field of data communications in the public and private domain and, moreover, in this field the technology has been the subject of continuous advancement and expansion. In the public domain, the telephone and Telex networks, employing exchanges operating on so-called space-switching principles, have provided their own independent data-communication services and cater for relatively low-speed data-transmission rates. The Telex network presently provides a service based on 50 bits per second (b/s) data-transmission rate and is apparently developing towards the use of a 200 b/s system. The Datel service, using the public automatic telephone exchange network, already caters for several ranges of data-transmission rates to a maximum of 1.2 Kb/s; namely "Datel," "Datel 200" and "Datel 400" providing for speeds up to 160 b/s, 200 b/s and 1.2 Kb/s respectively. Thus in the public domain subscribers' data terminal equipments having a variety of data-rate capabilities lying within the limited transmission frequency spectrum of the existing networks are catered for. Likewise in the private domain, where subscribers may resort to the leasing of lines from the Telex and telephone operating authorities, data communication networks involving a range of data-rate capabilities have developed over a period. The utilisation of the system Datel 2,400 (which employs data rates of 2.4 to 9.6 Kb/s) in this field, points to the general need for a national data-switching network having higher-speed data-transmission capabilities than those at present provided over the national telephone network. Indeed with the advent of computer bureaux and other services, requiring the handling of vast amounts of data with the minimum delay, the need arises for a data-switching network catering for terminals having a data-transmission rate capability of up to 48 Kb/s.

In the public domain the rapid growth of data-intercommunication requirements, which is being imposed on the existing telephone switching network by Datel and like facilities, is such that a severe inadequacy in the service is becoming evident; the inadequacy arising primarily from an insufficiency of exchange switching equipment which indeed was not initially intended for data communication, and which inherently involves long call setting-up times besides restricting subscribers to the use of data rates compatible with the speech-frequency band.

The problems outlined above have led to the proposal to create a national data-switching network embracing, or capable of embracing, all existing and contemplated classes of subscribers and providing for the possibility of intercommunication between them with an extended range of facilities.

Having decided on the general nature of the data-switching network and the exchanges to be incorporated in it it is convenient to relate the manipulative rates of the exchanges and indeed of the network as a whole to that category of terminal equipments working at the highest speed, namely 48 Kb/s and to rationalise the lower-speed terminal equipments by placing them in operational categories having relevance to the high-speed rate. Accordingly for example three low-speed categories of terminal equipments are created namely (a) up to 600 b/s, (b) 600 to 2,400 b/s and (c) 2.4 Kb/s to 9.6 Kb/s. It is convenient to organise switching within the proposed data exchanges on a 10-bit character basis with each character envelope constituted by eight data bits and two additional administrative bits, i.e., one bit - the "synchronising" bit - for character synchronising purposes and another bit - the "signalling" bit - for character-function interpretation purposes. This entails interfacing the various categories of terminal equipments with means, to be called network terminal units, whereby those of nominally the 48 Kb/s category utilise a network bit rate of 60 Kb/s whereas the low-speed categories, designated (a), (b) and (c) above, are associated with the network at the effective rates of 750 b/s, 3 Kb/s and 12 Kb/s respectively. It is to be noted that the network data rates of the three low-speed categories are exact sub-multiples (80, 20 and 5 respectively) of the high-speed 60 Kb/s rate. This permits blocks of low-speed terminal equipments to be multiplexed at the 60 Kb/s rate to enable all categories of subscriber's stations of the network to be handled throughout the network and the data exchanges on a compatible basis. Typically externally of the exchanges, eighty 750 b/s or twenty 3 Kb/s or five 12 Kb/s subscribers' stations or suitable combinations thereof may be combined in a 60 Kb/s multiplex.

Data-switching exchanges of a national network catering for a multiplicity of intercommunication services, covering digital data, Telex and facsimile requirements, with various data rates, are required to have minimal caller access and call set-up times. Also at the discretion of the parties to whom the data intercommunication service is provided, the exchanges must be capable of providing communication between stations effectively operating at the same or different data-rates with direct, i.e., so-called circuit-switched, intercommunication between stations operable at like data rates and so-called "store-and-forward" facilities (involving packeting techniques) in respect of communication between stations using different data rates; with the proviso that the store-and-forward facilities are also to be available in respect of both types of intercommunication in the case of say multi-address and delayed delivery calls.

An object of the invention is to provide a data-switching exchange which meets all the foregoing requirements efficiently and economically.

According to the invention there is provided a data-switching exchange serving, on a two-way transmission basis, a plurality of data-rate categories of subscribers' stations and in which there is provided a switching network that includes a plurality of incoming highways and a corresponding plurality of outgoing highways arranged in pairs each comprising an incoming highway and an outgoing highway and at least one such pair is dedicated to each data-rate category of subscribers' stations and highways of a pair accomodate incoming and outgoing multiplexes respectively to handle information in respect of the same plurality of subscribers' stations on a character-interleaved time-division multiplexed basis in the same synchronous multiplex time-slot-appearance order, a separate group of so-called cords dedicated to that pair or those pairs of highways of each category of subscribers' stations and a plurality of first crosspoint arrays each for selective connection of each incoming highway of a particular dedication to the input path of any correspondingly dedicated cord and a plurality of second crosspoint arrays each for selective connection of each outgoing highway of a particular dedication to the output path of any correspondingly dedicated cord and in which each cord has time-slot-appearance changing capabilities in respect of characters duly forthcoming to it from an incoming highway and destined for an outgoing highway, circuit-switched intercommunication between two stations of the same data-rate category being effected by the utilisation of one of the cords dedicated to that category and by controlled operation of selected crosspoints of the first and second arrays appropriate to the utilised cord. The term multiplexes as used herein is meant to indicate streams of time division multiplexed data characters.

Also according to the invention the data-switching exchanges incorporates for message packeting and forwarding purposes a message-packet store together with, for each data-rate category of subscribers' stations, a packet-assembly highway giving access to a group of packet-assembly buffers and a packet-dissembly highway accessible from a group of packet-dissembly buffers, each said packet-assembly highway having cyclic appearance periods for each of its assembly buffers and being selectively connectable over further crosspoints of an aforesaid second crosspoint array to the output paths of that group of cords which are appropriate to its data-rate category whereas each said packet-dissembly highway having cyclic appearance periods for each of its dissembly buffers is selectively connectable over further crosspoints of an aforesaid first crosspoint array to the input paths of that group of cords which are appropriate to its data-rate category.

The invention together with other features will be understood from the following description of one method of carrying it into effect which should be read in conjunction with the accompanying drawings.

Figure 3:
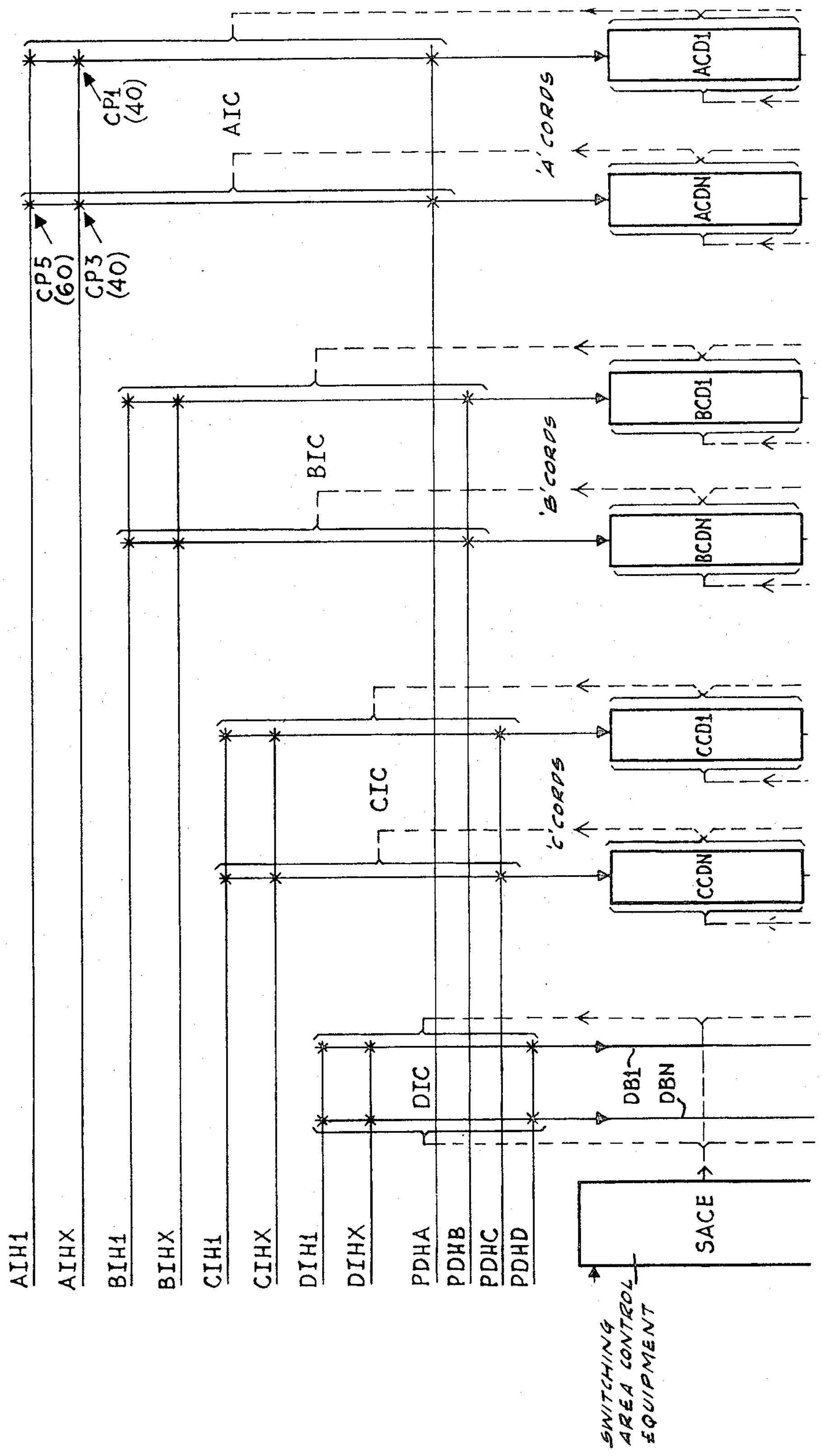
Figure 4:
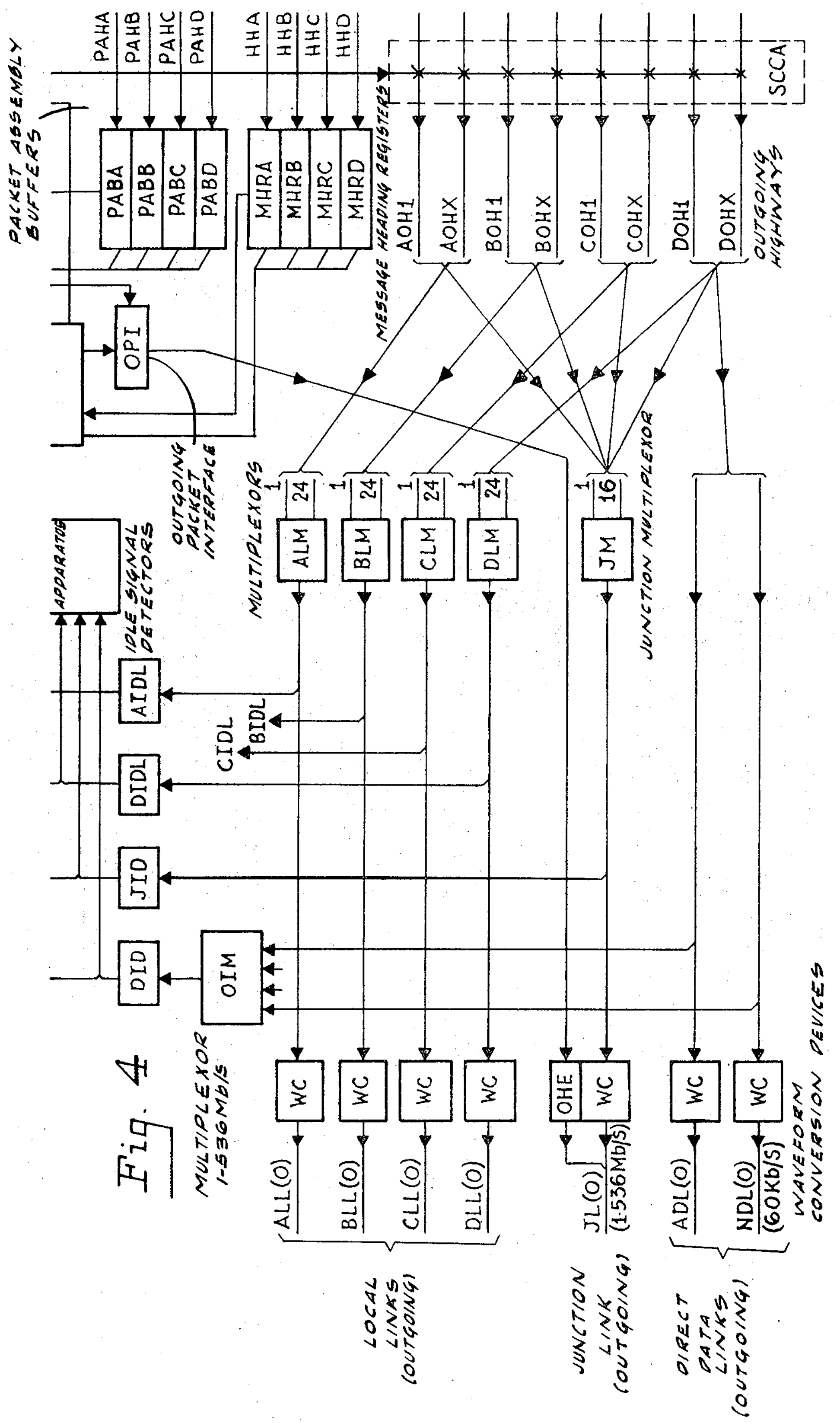
Figures 5, 6:
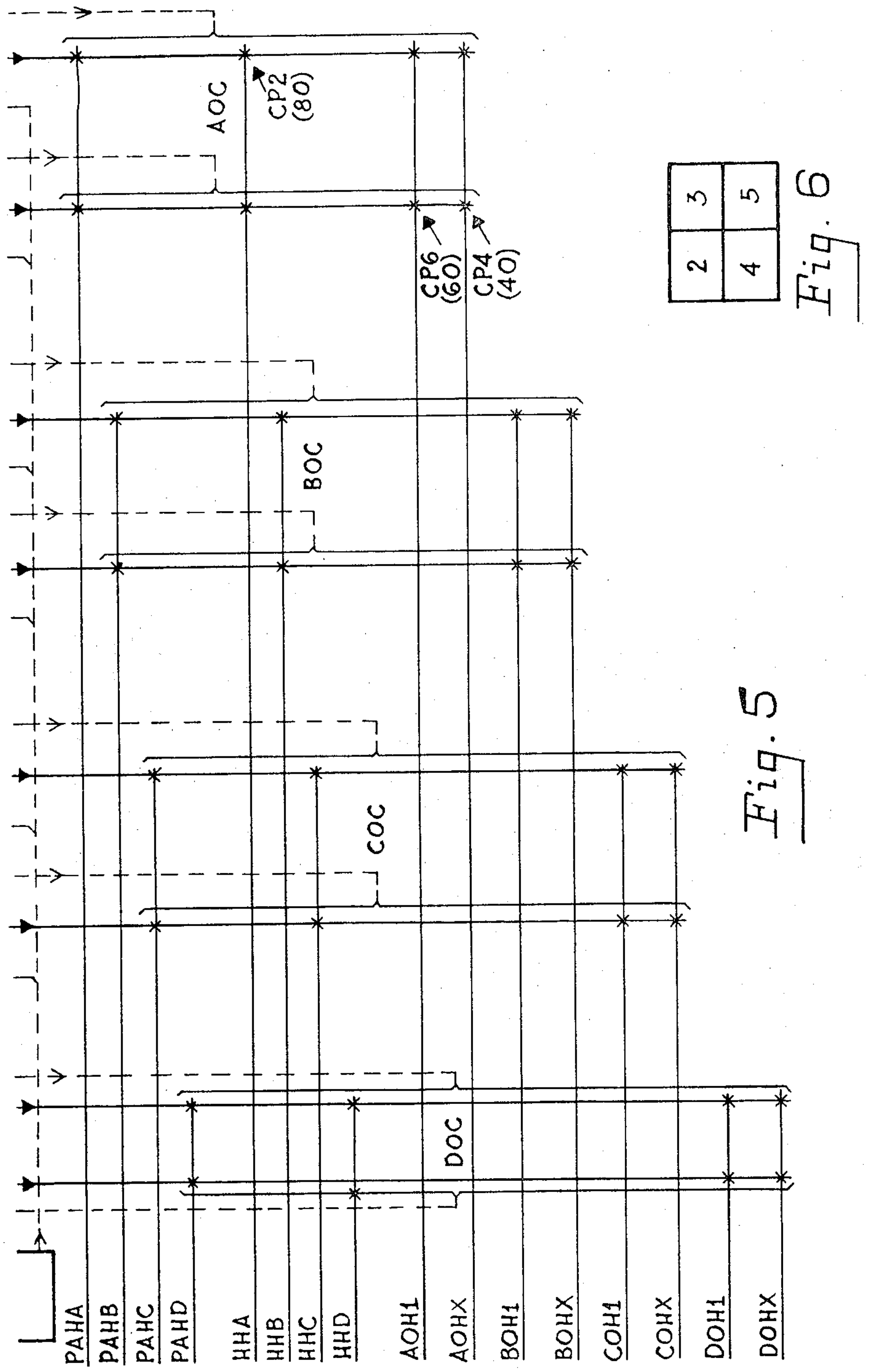
Figure 7:
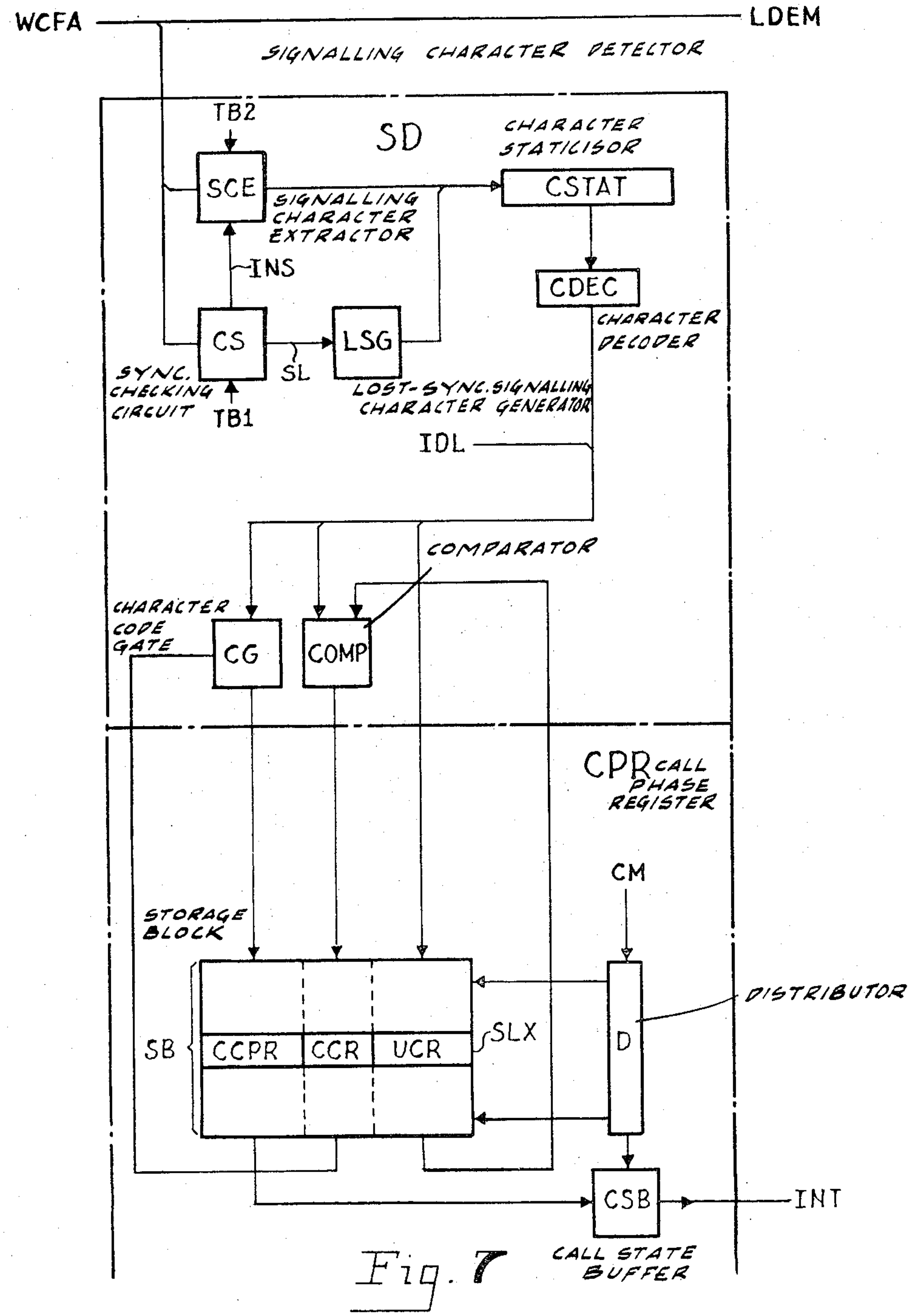
Figure 8:
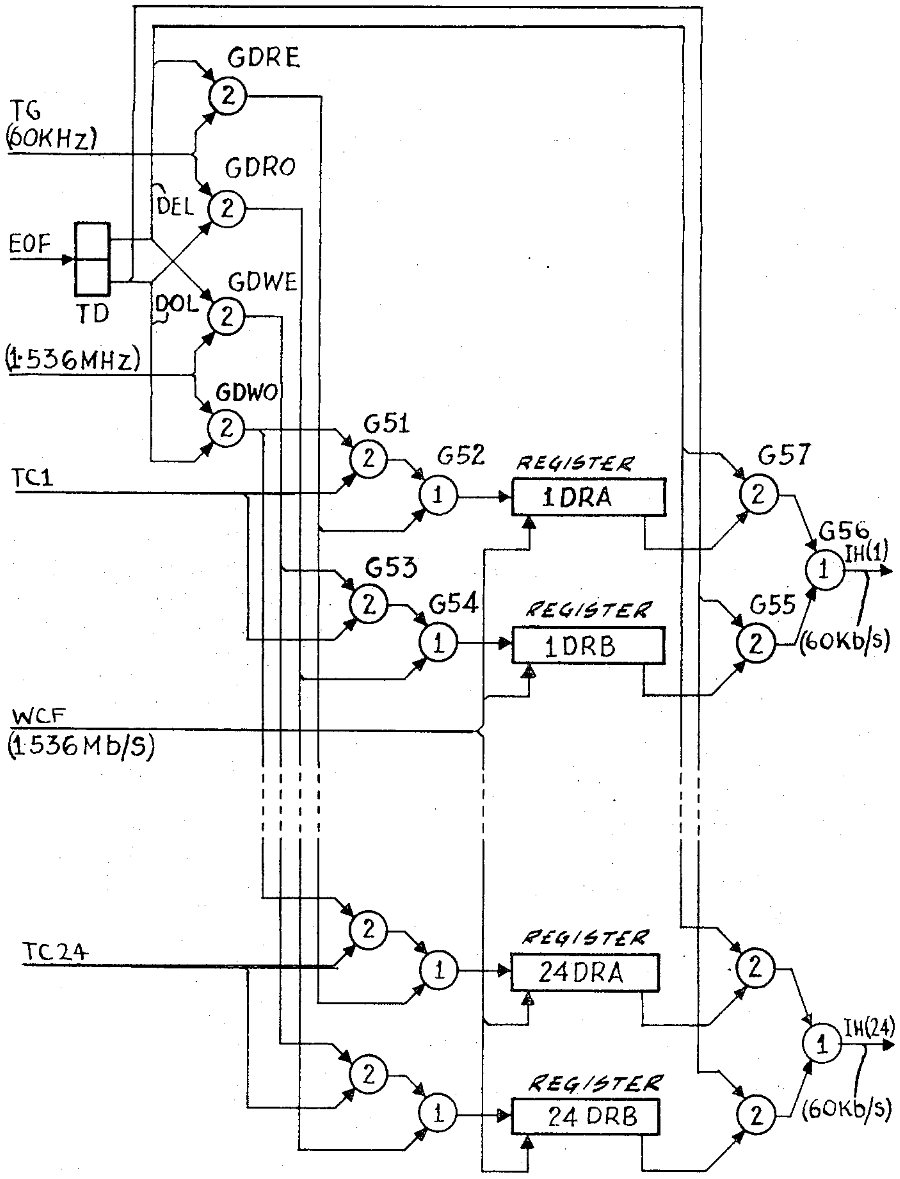
Figure 9:
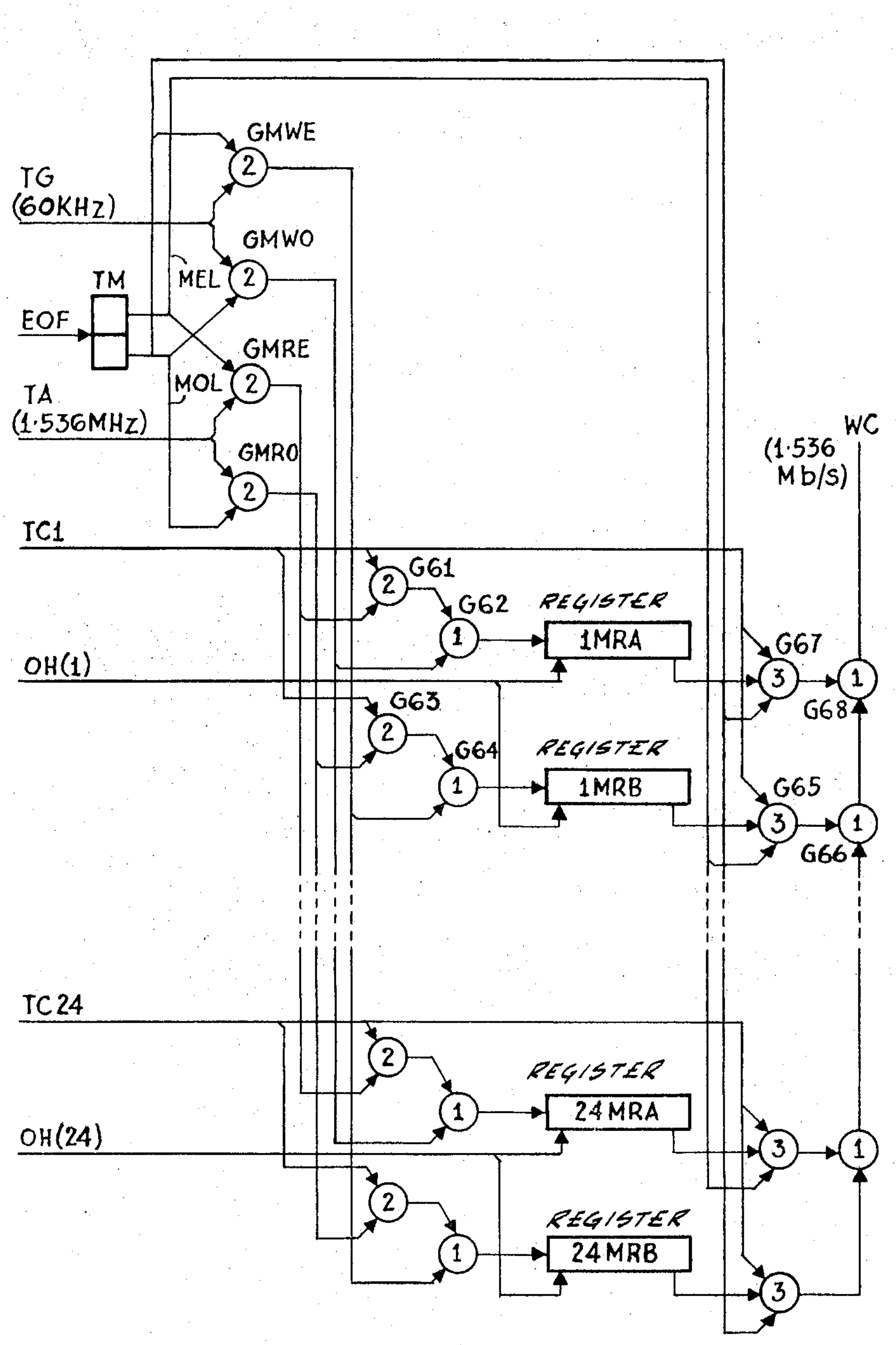
Figure 10:
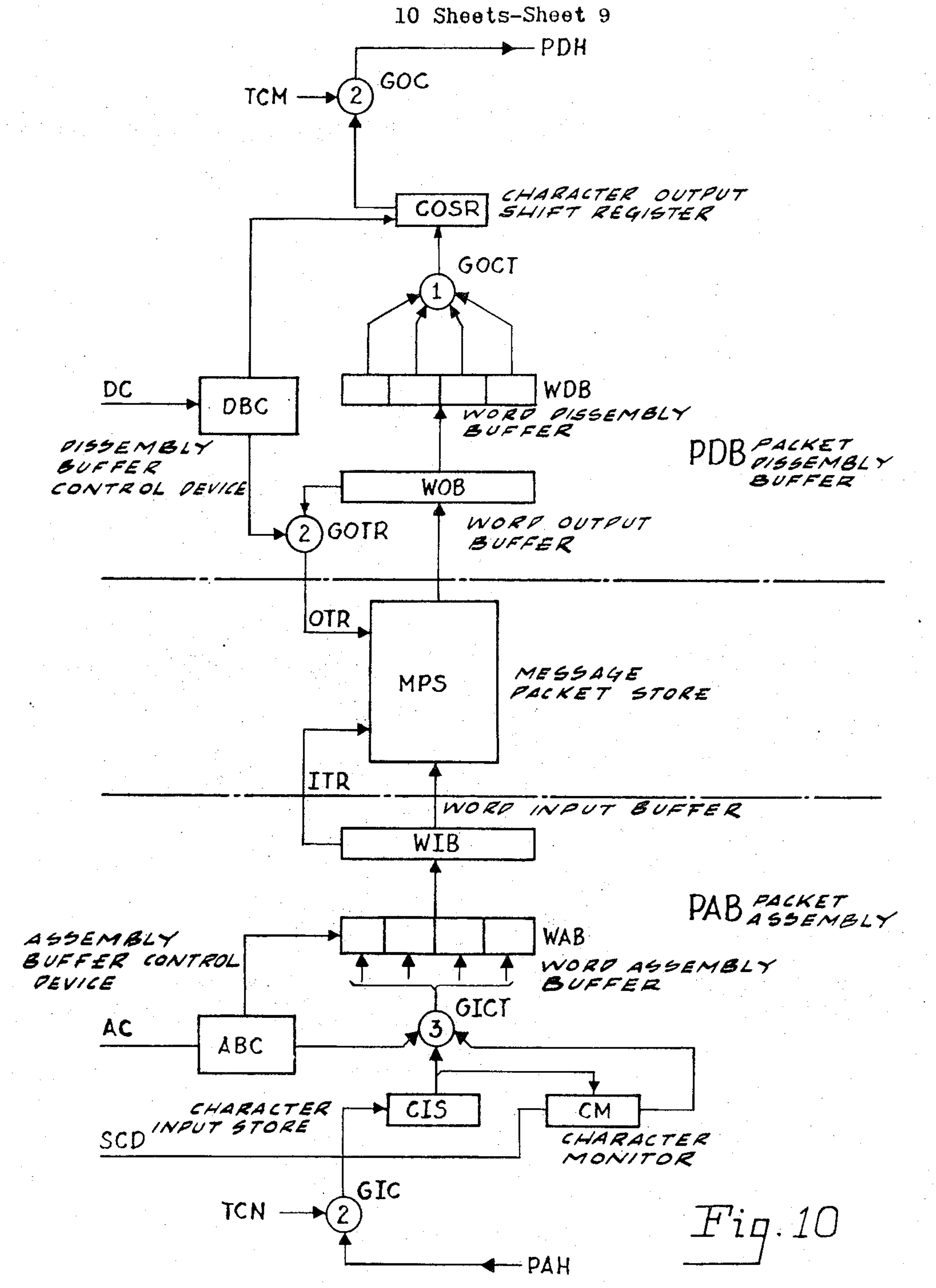
Figure 11A:
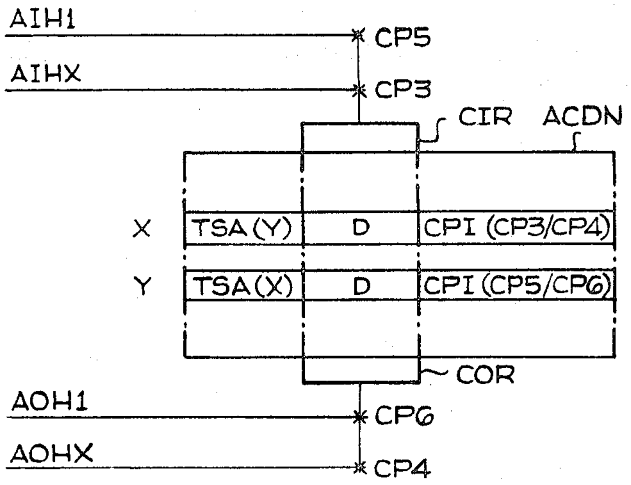
Figure 11B:
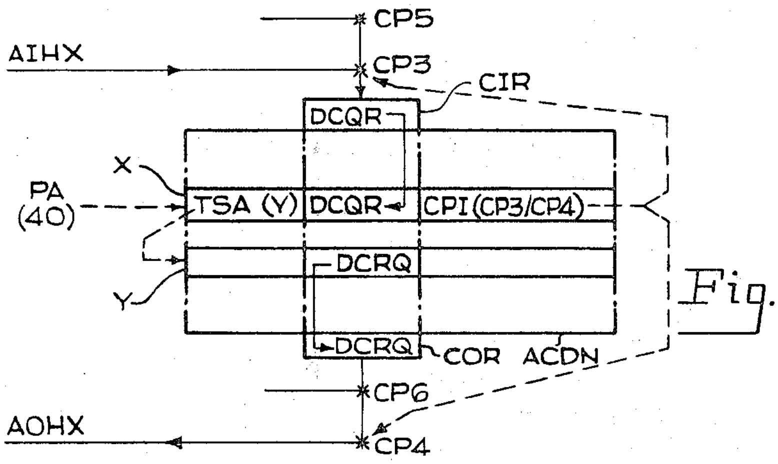
Figure 11C:
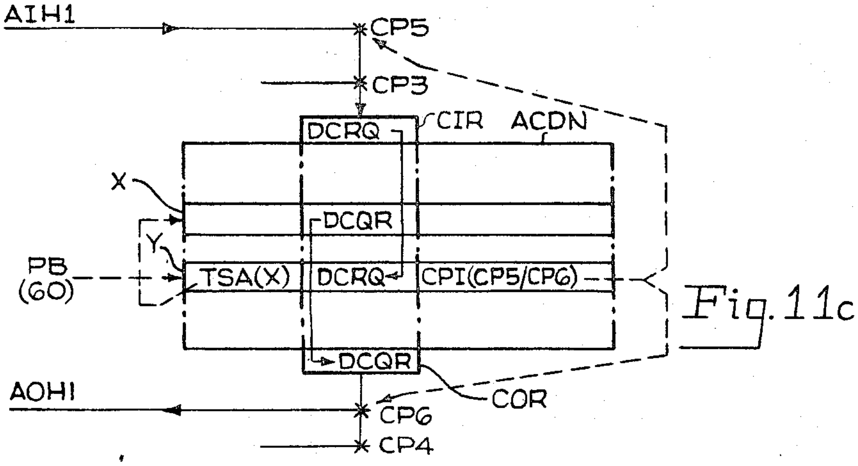

Of the drawings: FIG. 1 shows a typical geographical layout of a portion of a data-switching network;

FIGS. 2, 3, 4 and 5, to be placed according to FIG. 6, constitute an abbreviated diagram of a data-switching exchange according to the invention:

FIG. 7 represents in outline a signalling detector and part of the call-phase register apparatus used in the exchange, FIG. 8 exemplifies the so-called de-multiplexer arrangements for use in the exchange;

FIG. 9 exemplifies the so-called multiplexer arrangements employed;

FIG. 10 depicts schematically certain of the arrangements concerned with packet-switched calls to be handled by the exchange; whereas FIGS. 11*a* to 11*c* will serve to depict functions to be performed by so-called cords incorporated in the exchange.

THE EXCHANGE ENVIRONMENT

To understand the function of the typical data-switching exchange with which the present invention is concerned, it is necessary to have some appreciation of the operational environment of such an exchange. For this purpose an outline of a typical environment is now presented with reference to FIG. 1.

This diagram shows a portion of a contemplated national data-switching network and includes two data-switching exchanges 1DSE and 2DSE interconnected by a plurality of pairs of junction links, such as JL(I) and JL(0). Each junction link is arranged for t.d.m. (time-division-multiplex) working typically at a 1,536 Mb/s rate, and it may be taken that links JL(I) and JL(0) are concerned with transmission directions incoming and outgoing respectively in relation to exchange 1DSE. At least one of the pairs of junction links has some of its transmission capacity allocated for use at a single high-speed (480 Kb/s) channel for the communication of information packets, i.e., message packets and signalling packets.

The typical exchange 1DSE, besides being interconnected to other exchanges such as 2DSE over junction links, is to be considered as providing service to a metropolitan area involving possible several thousands of subscribers' stations, principally located in four adjacent geographical areas W, X, Y and Z of which the first is represented to an extent adequate to the appreciation of the principles involved. Each area is served by a plurality of multiplexer/de-multiplexer units such as 1M/D. These units are conveniently termed 1st-stage multiplexers and may each be housed in the same premises as a conveniently located "local" automatic telephone exchange.

According to the disposition of the different categories of subscribers's stations within the region served by the typical data-switching exchange, each 1st-stage multiplexer may be dedicated to a cluster of subscribers' stations of one slow-speed data-rate category, namely 750 b/s, 3 Kb/s or 12 Kb/s which may be conveniently termed A, B and C categories respectively. Alternatively the 1st-stage multiplexer may serve stations of any two or all three categories, but in every case the maximum number of subscribers' stations is determined by the capacity of the 60 Kb/s multiplexing and de-multiplexing functions of the 1st-stage multiplexer.

Thus in the case of 1st-stage multiplexer dedicated to one category of subscribers' stations it may serve 80, 20 or 5 stations of category A (750 b/s), B (3 Kb/s) or C (12 Kb/s) respectively, whereas in the case of a 1st-stage multiplexer serving combined categories the maximum number of stations will be arbitrarily within the range 8 (4 of B and 4 of C) to 77 (76 of A and 1 of B). For example a mixed category 1st-stage multiplexer may serve 38 subscribers' stations comprising 32, 4 and 2 in categories A, B and C respectively. The exemplary capacities of the 1st-stage multiplexer in terms of subscribers' stations takes no account of the fact that one channel may be appropriated for network synchronisation purposes.

The typical 1st-stage multiplexer 1M/D serves all three categories (A, B and C) of low-speed subscribers' stations comprising a cluster about it; one station of each category being shown. The particular stations are each represented by the data terminal equipment (ADTE, BDTE or CDTE) with its appropriate network terminal unit (ANTU, BNTU or CNTU) the respective prefix characters of the designations being indicative of the data-rate, as regards the network, of the station. As already mentioned the network terminal units provide the interfaces between the data terminal equipments and the network for bit-rate compatibility purposes. Each synchronously-operating station of the cluster is connected to the 1st-stage multiplexer by a line comprising "go" and "return" pairs, and the 1st-stage multiplexer, like all others of the area W is connected to another multiplexer/de-multiplexer unit 2M/D unique to the area. The latter station, conveniently to be referred to as the 2nd-stage multiplexer, may be housed in the same premises as a strategically located local exchange or group-switching centre of the telephone network.

The connection between each 1st-stage multiplexer and the common 2nd-stage multiplexer comprises a pair of so-called primary links (one for each direction of transmission and operable at a 60 Kb/s rate) such as those collectively designated PL(1). The organisation of 1st-stage multiplexer 1M/D and the 2nd-stage multiplexer 2M/D with respect to the pair of 60 Kb/s links PL(1) is such that data from and to each subscriber's station of the 1st-stage multiplexer is evident upon the respective link on a bit-interleaved basis (16.6 micro-sec. per bit) with stations in the A(750 b/s), B(3Kb/s) and C (12 Kb/s) categories having unique 1-bit appearances every 80 (1.33 ms), 20 (0.33 ms) and 5 (83 micro-sec) bits respectively; corresponding bit appearance times being used for each station in respect of the pair of primary links. In this manner a unique time-corresponding channel in each link is identified with a particular subscriber's station. The data streams from and to each network terminal unit are treated, within the network as a series of 10-bit characters, each character consisting of eight data bits and the before-mentioned additional administrative bits. Accordingly, characters are constituted in respect of category A, B and C subscribers' stations in periods of 13.3 ms, 3.3 ms and 830 micro-sec. respectively.

As may be inferred from FIG. 1, several subscribers' stations, of area W, such as that incorporating data terminal equipment DDTE(W) and network terminal unit DNTU(W) and operating at the 60 Kb/s rate may be directly connected to the 2nd-stage multiplexer 2M/D, over an appropriate line comprising go and return pairs. stations of this category, conveniently to be referred to as category D (i.e. 60 Kb/s operation), may for instance relate to computers. Other stations of the same category may be directly connected, over an individual 2-way link such as ADL, the data-switching exchange 1DSE as in the case of that involving data terminal equipment DDTE(L) and network terminal unit DNTU(L).

The 2nd-stage multiplexers of the four areas W, X, Y and Z, comprising the region served by exchange 1DSE, are connected to the latter over routes RW, RX, RY and RZ respectively; the route RW appropriate to 2nd-stage multiplexer 2M/D being more fully represented. This comprises four pairs of so-called local links ALL(I)/ALL(O), BLL(I)/BLL(O), CLL(I)/CLL(O) and DLL(I)/DLL(O), the first and second link of each pair being respectively concerned with information incoming to and outgoing from the exchange.

Each local link is synchronously operable at a rate of 1.536 Mb/s and, as is to be inferred from the initial reference symbols of the links, the pairs of links are appropriately dedicated to A, B, C and D categories of subscribers' stations.

The local links are operative on a character interleaved basis, the links of each pair, ALL(I)/ALL(O), BLL(I)/BLL(O), CLL(I)/CLL(O) and DLL(I)/DLL(O), comprising respectively 1,920 channels individually dedicated to category A subscribers, 480 channels individually dedicated to category B subscribers, 120 channels individually dedicated to category C subscribers and 24 channels individually dedicated to category D subscribers. Each subscriber is allocated a channel having the same appearance times on each of the relevant pair of local links.

The dedication of local (1.536 Mb/s) links to particular categories of subscribers' stations in the foregoing manner, arises out of the specific input/output arrangements of the data-switching exchange to be described. However it is appreciated that said input/output arrangements may be adapted for the utilisation of one or more local links each serving more than one station category. In these circumstances, each such link would have its component 60 Kb/s multiplexes individually dedicated to a particular category.

A frame of each 1.536 Mb/s multiplexed local link can be considered as consisting of 24 channels, each carrying a corresponding 10-bit character from each of 24 of the 60 Kb/s multiplexed primary links (and direct D-category station links) which it serves. The channel repetition rate of each local link is governed by the data-rate of the subscribers' stations which it serves. Thus in the case of links ALL(I)/ALL(O), the channel repetition rate will be once every 80 frames of the 1.536 Mb/s multiplex; in the case of links BLL(I)/BLL(O), the repetition rate will be once every 20 frames; in the case of links CLL(I)/CLL(O), the repetition rate will be once every five frames; while in the case of links DLL(I)/DLL(O), the repetition rate will be once per frame. Each frame of a 1.536 Mb/s multiplex takes 166 micro-sec., hence the repetition rates quoted above are 13.3 ms, 3.3 ms, 833 micro-sec., and 166 micro-sec. respectively, which in each case directly corresponds to the time to embrace a 10 -bit character.

It is evident that 60 Kb/s is not an exact sub-multiple of 1.536 Mb/s and this leaves the spare capacity of each such frame, namely 16 bits, available for the purpose of synchronisation of the local link with respect to all other local links of the particualr data-switching exchange.

From all the foregoing description it may be concluded that the setting-up of a connection between two subscribers' stations of the region which are in the same category A, B, C or D, merely requires the exchange to determine the incoming and outgoing local link channels appropriate to each of them and to interpose, between the incoming channel of each and the outgoing channel of the other, means to accommodate any difference in the channel appearance times. This conclusion is correct in those many instances where the two satations are identical, and would apply, for example, if the fundamental data rates of the two terminal equipments were 600 b/s placing them in category A with 750 b/s network rates. On the other hand if the two stations are in different categories "store-and-forward" techniques at the exchange must be resorted to. Indeed these techniques may be employed in the case of like-category stations having different fundamental data rates where the problem to be overcome can be typified by contemplating a connection from a category A subscriber's station (X), having a fundamental rate of 600 b/s, to another category A subscriber' s station (Y) having a fundamental rate of 50 b/s. Obviously if a direct (i.e., circuit-switched) connection is established, the data terminal equipment at station Y could not handle the data incoming from the higher-speed station X unless an indeterminate amount of data-storage capacity were provided at station Y. The provision of such storage capacity at subscribers' stations for this purpose would not be in the interests of economy particularly since the data-switching exchange itself incorporates store-and-forward (i.e., "message-packeting") facilities for use for example on multi-address and delayed delivery calls.

Accordingly the exchange is arranged in respect of calls between stations having different fundamental bit rates, to make use of the facilities mentioned. The packeting equipment is interposed between the two sides of the connection and caters for such change of data-rate as may be required.

As an alternative to the use of message-packeting techniques at the exdhange, in respect of intercommunication between stations of the same category but of differing fundamental data-rates circuit-switching may be employed providing the station having the nominally higher data-transmission rate is constrained to transmit at the data-rate appropriate to the other station; "filler" characters being produced by the transmitting station to align the data-rates.

As regards the pairs of inter-exchange junction links which are operable at 1.536 Mb/s, some of the transmission capacity of at least one pair, typically sixteen 60 Kb/s channels (each of the two links), is allocated for handling circuit-switched junction calls, whereas the remainder of the capacity, i.e., eight 60 Kb/s channels, is allocated for use as a single high-speed channel for the communication of information packets, i.e., message packets and signalling packets. It may be taken that the maximum size of any information packet is such that its transmission over the high-speed (480 Kb/s) channel is accomplished with 0.5 ms.

SIGNALLING CHARACTERS

A variety of network control "signalling" characters are utilised by the data-switching network in respect of signalling between a data-switching exchange and the stations served by it. As in the case of "data" characters, these are of 10 bits each and in general (although not always necessary) they are distinguishable from data characters by the significant marking of the signalling bit, i.e., one of the two beforementioned administrative bits. The signalling characters employed may be based on 7-bit character sets in accordance with the C.C.I.T.T. International Alphabet No. 5/ISO with an additional party bit. Control signals employed include those listed below in relation to their directions of transmission:

| SIGNAL | STATION : EXCHANGE |
|---|---|
| Clear (CLEAR) | ←→ |
| Request-for-service (RS) | → |
| Proceed-to-select (PS) | ← |
| End-of-heading (EOH) | → |
| Calling (CALLING) | ← |
| Ready (READY) | ←→ |
| Idle (IDLE) | ←→ |
| Called-terminal-engaged (CTE) | ← |
| Called-terminal-unobtainable (CTU) | ← |
| End-of-packet (EOP) | → |

Repetitive CLEAR signals are transmited respectively from the data switching exchange to all quiescent subscribers' stations and such stations respond by transmission of CLEAR signals repetitively to the exchange. The signal interplay, by utilisation of the synchronising bit, enables all the stations to be synchronised with the data-switching exchange. The interplay also enables indications to be provided at the stations and the exchange in respect of the communication-path being fault-fee; the absence of such CLEAR signal interplay in respect of any quiescent station would infer a communication-path fault and result in appropriate indications.

When a subscriber initiates a call the CLEAR signals transmitted from his network terminal unit are replaced by repeated RS (request-for-service) signals. The valid reception of an RS signal by the exchange results in the return of the repeated PS (proceed-to-select) signal in place of the CLEAR signal. The PS signal when detected at the calling station disables the RS signal and evokes transmission of the so-called "message heading."

The message heading consists, in order, of (a) class-of-service characters, i.e., digit characters, (b) the network address of the wanted station, ie., digit characters, and (c) the EOH (end-of-heading) signalling characters.

The EOH signal is repetitively transmitted by the calling station and as a result, the central control equipment of the exchange, in the case of the message heading having determined that the call is to be a local circuit-switched call, consults a map relevant to all subscribers' stations of the exchange to determine whether the particular wanted station is available. If this is so, the CALLING signal is transmitted, by the exchange to the wanted station, in place of CLEAR. The wanted station is thereupon normally responsive to replace its CLEAR signal transmission by the READY signal. The reception of this READY signal by the exchange disables transmission of the PS signal to the calling station. As a result of establishment, at this juncture, of the two-way commmunication path between the two stations, by the switching area of the exchange, the READY signal received from the called station is extended to the calling station. Consequently transmission of the EOH signal by the latter is also replaced by the READY signal which is (a) operative in the exchange to disable transmission of the CALLING signal to the called station, and (b) is extended over the switching area to the called station.

The READY signal received at the called station causes the latter to transmit the IDLE signal to the exchange, and this is extended over the switching area to the calling station. The calling station responds by transmitting the IDLE signal to the exchange in place of READY; the IDLE signal being advanced to the called station over the switching area.

The situation now is that the continuity and effectiveness of the two-way communication path has been confirmed and therefore message transmission may be performed in either or both directions as may be required. At the end of the message-transfer procedure, cleardown of the connection may be initiated from either station by transmission of a CLEAR signal from it. As a result of this both stations revert to their quiescent states evidenced by the CLEAR-CLEAR signal interchange between the data-switching exchange and the particular subscribers' stations.

The brief outline of the signalling sequence employed on a local circuit-switched call has involved the use of all except the last three control signals of the foregoing table. Of these the CTE (called-terminal-engaged) signal and the CTU (called-terminal-unobtainable) signal will be generated by the exchange and returned to the calling station instead of the READY when the required call cannot be completed because the wanted station is currently indicated, upon consultation of the map, as being in the bysy or for example switched-off state respectively.

The remaining signal of the table namely the EOP (end-of-packet) signal is concerned with the store-and-forward or so-called packet-switched capability of the exchange, to define in certain circumstances the end of each packet of a message transmission emanating from a subsceiber's station.

THE DATA-SWITCHING EXCHANGE

Figure 2:
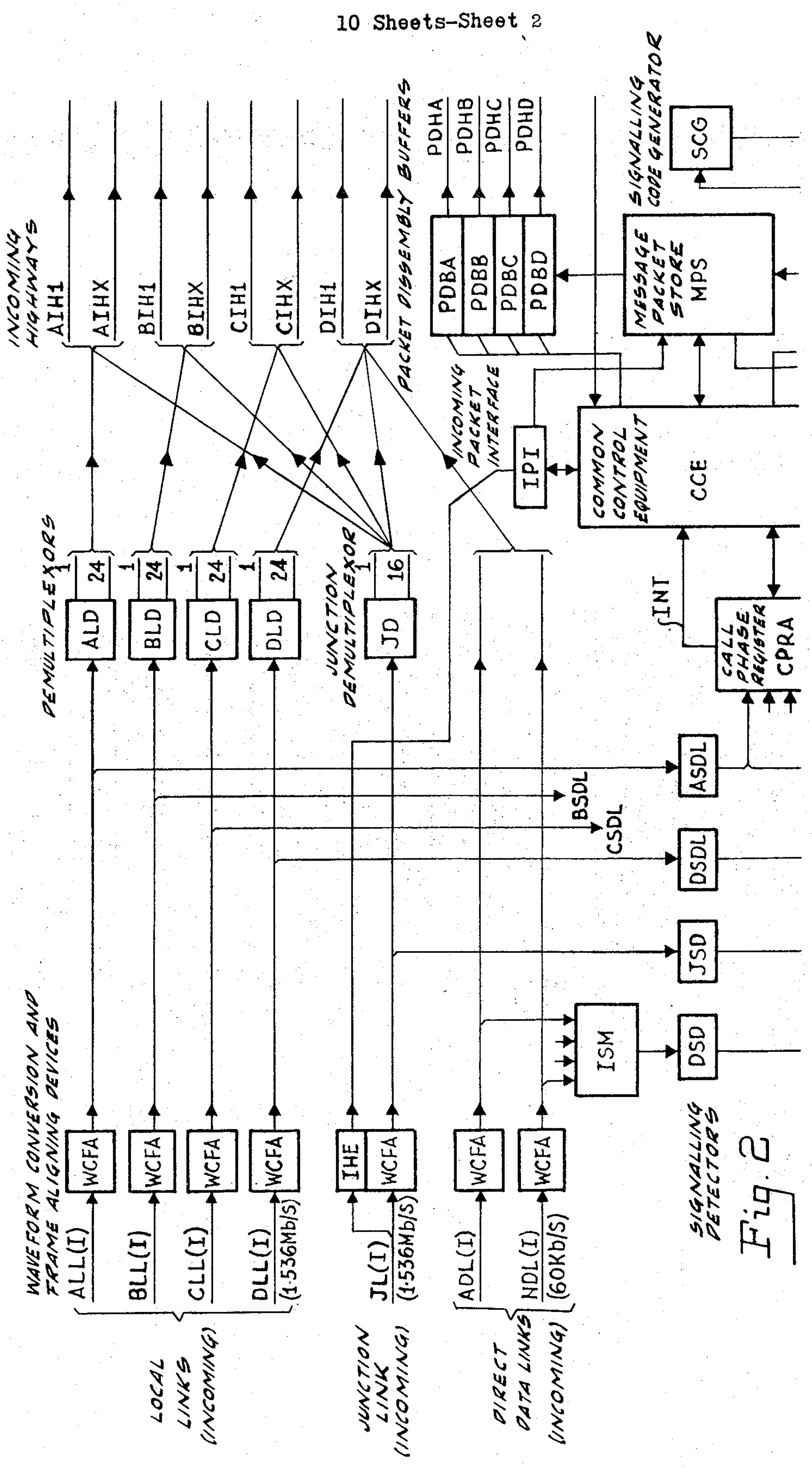

The arrangement of a data-switching exchange in accordance with the present invention will now be described with reference to FIGS. 2 to 5 of which FIGS. 2 and 4 relate to the exchange input/output and common control area whereas FIGS. 3 and 5 depict the switching area which comprises incoming and outgoing 60 Kb/s highways, so-called cords and electronic high-speed crosspoint switches. The exchange is to be interpreted as being that designated 1DSE in FIG. 1.

INPUT/OUTPUT AND COMMON CONTROL AREA

Of the various paths appearing at the left of FIGS. 2 and 4, ALL(I), BLL(I), CLL(I) and DLL(I) are incoming local links (1.536 Mb/s) dedicated to category A, B, C and D stations respectively of area W, whereas ALL(O), BLL(O), CLL(O) and DLL(O) are corresponding outgoing links. Similarly paths JL(I) and JL(O) relate to incoming and outgoing junction links (1.536 Mb/s) appropriate to exchange 2DSE and as already mentioned each of these incorporates sixteen 60 Kb/s channels for circuit-switched communications for all station categories and a high-speed channel embracing the remaining eight 60 Kb/s channels. The high-speed channel carries information packets both for signalling and packet-switched messages. The paths ADL(I) to NDL(I) together with their partner paths ADL(O) to NDL(O) are direct (incoming and outgoing respectively) data links operating at 60 Kb/s and serving category D stations, such as that comprising devices DDTE(L) and DNTU(L) in FIG. 1, which are directly associated with the exchange (1DSE).

The various incoming links are separately terminated upon wave-form conversion and frame-aligning devices WCFA. Each of these has two functions, the first function is concerned with converting the character-interleaved link bit-stream (bi-polar form) to simple binary d.c. levels compatible with the processing requirements of the exchange. The second function of the devices, namely frame-aligning, provides for bit and frame-synchronisation of the incoming bit-stream with the exchange clocks. Typically the frame-aligning section of each device consists of a buffer store into which the incoming bit-stream is written under the control of timing pulses derived from that stream and from which it is read under the control of time pulses from an exchange clock.

The converted and time-aligned bit-streams (1.536 Mb/s - character-interleaved) of the incoming links ALL(I), BLL(I), CLL(I) and DLL(I) are each extended into a relevant de-multiplexer ALD, BLD, CLD or DLD appropriate to category A, B, C and D stations respectively of area W of FIG. 1; the de-multiplexers, which are identical, taking the form shown in FIG. 8. The converted and time-aligned bit-streams of the aforesaid incoming links are also extended to signalling-character detectors ASDL, BSDL, CSDL and DSDL respectively of which the first and last only are represented; the detectors each taking the form shown in FIG. 7. Likewise the converted and time-aligned bit-stream of the incoming junction link JL(I), which incorporates the sixteen 60 Kb/s channels specifically dedicated to A, B, C and D station-category working in respect of circuit-switched calls, is directed to the de-multiplexer JD which is to be operative only as regards those 16 channels, and to the signalling character detector JSD. The high-speed junction-channel is effectively tapped-off by the high-speed channel equipment IHE for delivery, by way of an incoming packet interface equipment such as IPI, of information packets to the common control equipment CCE and the message packet store MPS of the exchange.

The de-multiplexers ALD, BLD, CLD and DLD each break down the relevant 1.536 Mb/s bit-stream into 24 concurrent 60 Kb/s bit-streams at 24 output leads each such 60 Kb/s bit-stream comprising, in the fully equipped case, 80 (A category), 20 (B category), 5 (C category), or 1 (D category) channels. The output wiring of each of the de-multiplexers is such that the 24 output leads of each of them are connected to the relevant group of 60 Kb/s single-conductor incoming highways of the exchange switching area. Thus the 24 output leads of de-multiplexer ALD are separately connected to 24 incoming highways included in the group AIH1 to AIHX and dedicated to A category (750 b/s) stations. The 24 output leads of de-multiplexers BLD, CLD and DLD are similarly related to highways within groups BIH1 to BIHX, CIH1 to CIHX and DIH1 to DIHX and dedicated to B (3 Kb/s), C (12 Kb/s) and D (60 Kb/s) stations respectively. It is important to note that each channel of each of the highways alluded to is specifically pertinent to a particular subscriber's station in area W of FIG. 1.

The incoming junction link JL(I) caters for circuit-switched junction traffic involving all four categories of stations A, B, C and D and the 1,536 Mb/s multiplex includes sixteen 60 Kb/s multiplexed channels for this purpose, each of which is individually allocated in accordance with junction traffic requirements, for working in respect of a particular category. The junction de-multiplexer JD is so organised as to break down this circuit-switched portion of the incoming junction 1.536 Mb/s bit-stream into its 16 component 60 Kb/s multiplexes or streams at the 16 output leads of the de-multiplexer. Those of the 16 output leads appertaining to junction traffic involving A, B, C and D category stations are connected to unique highways in groups AIH1 to AIHX, BIH1 to BIHX, CIH1 to CIHX and DIH1 to DIHX respectively, so that the highways in each group includes 24 dedicated specifically to subscriber stations of area W in the appropriate category and an arbitrary number related to junction traffic involving subscribers' stations of the same category.

The wave-form conversion and frame-aligning devices of the incoming data links ADL(I) to NDL(I) serving category D stations local to the exchange are connected directly to individual incoming highways of group DIH1 to DIHX; the 60 Kb/s streams requiring no de-multiplexing. The signalling-character detector DSD, which serves up to 24 such category D stations, is interfaced with the relevant devices WCFA by a 1.536 Mb/s multiplexer ISM so that all the signalling detectors are identical.

Each signalling detector (ASDL, BSLD, CSDL DSDL, DSD and JSD) associated as it is with an incoming local link of a particular category (A, B, C or D), or a group of up to 24 directly-connected category D links, or a multi-category incoming junction link, is promptly responsive to every valid signalling character forthcoming in the 1.536 Mb/s multiplex which it serves. Each encountered signalling character (after a confirmatory persistence check) is passed to the relevant one of a plurality of storage buffers provided on the basis of one to every incoming communication channel (i.e., station or junction path). The storage buffers are included in the call-phase register arrangement CPRA which has one call-phase register storage-block for each 1.536 Mb/s incoming multiplex. The call-phase register arrangement is organised to indicate the current call-progress state appertaining to each channel of every 1.536 Mb/s multiplex.

The exchange incorporates a high-speed central control equipment CCE preferably of the stored-programme data-processing type and this includes a storage device for the previously mentioned map having storage areas indicative of the busy or free states of all stations and junction channels of the exchange; the map being consulted in response to address information received in a message heading.

It is to be noted that the control equipment CCE is connected to the call-phase register arrangement CPRA by way of the multi-lead path INT. This path is used to enable the latter to promptly inform equipment CCE of each confirmed signalling character occurrence together with the identity of the communication channel involved.

The control equipment is also adapted, (a) to receive information from groups of message-heading registers such as MHRA, MHRB, MHRC and MHRD, (b) to control the message packet store MPS, the related groups of packet assembly buffers (PABA, PABB, PABC and PABD) and packet dissembly buffers (PDBA, PDBB, PDBC and PDBD) together with incoming and outgoing junction packet interface equipments such as IPI and OPI, (c) to administer the control equipment SACE of the exchange switching area, and d) to actuate the exchange signalling-character generator SCG. Signalling-character outputs of the latter, typically CLEAR, PS (proceed-to-select) and CALLING, are selectively connectable, over a cross-point switch array SCCA to four groups (AOH1 to AOHX, BOH1 to BOHX, COH1 to COHX and DOH1 to DOHX) of 60Kb/s single-conductor outgoing highways of the exchange switching area.

The signalling-character generator SCG may typically comprise a set of simple OR gates, one for each character to be generated, whose inputs are pulsed from a 60 Kb/s exchange clock. The pulses applied to a particular gate are arranged to correspond to the required temporal positions of the marks (ones) in the desired character and the gate outputs therefore consist of a continuous repetition of the particular character in every channel time-slot of the 60 Kb/s multiplex. The outputs of the various signalling character generating gates are controlled by channel time-slot conditioned gates whose timing control is arranged to be programmed to indicate the channels to which the corresponding signalling characters are to be applied.

Of the just-mentioned outgoing highways, 24 highways of group AOH1 to AOHX (i.e., the 24 dedicated to channels appertaining to category A subscribers' stations in area W) are combined to form a single outgoing local 1.536 Mb/s multiplex by multiplexer ALM. Similarly multiplexers BLM, CLM and DLM are related to sets of 24 outgoing highways in group BOH1 to BOHX, COH1 to COHX and DOH1 to DOHX respectively; the sets taken in order being related to category B, C and D stations also of area W. A typical multiplexer is shown in FIG. 9.

The group of outgoing highways DOH1 to DOHX includes a set of up to 24 which are individually dedicated to outgoing data links of directly-connected category D subscribers' stations and are individually connected to those data links over separate wave-form conversion and synchronisation pattern insertion devices WC.

The junction multiplexer JM has its 16 input leads distributed amongst the remaining outgoing highways of each group.

It is to be noted that the pattern of connections involving the previously-mentioned incoming highways of the switching area will be identical to the pattern of connections involving the outgoing highways. Furthermore it is essential to understand, (a) that each aforesaid incoming highway is related to a particular aforesaid outgoing highway in the sense that jointly they serve identical subscribers' stations or junction paths ( as the case may be) with the incoming highway carrying GO information and the partner outgoing highway carrying RETURN information, and (b) that the same channel appearance time is apportioned to each particular station or junction path in the two related highways.

The 1.536 Mb/s bit-streams emerging from multiplexers ALM, BLM, CLM and DLM are extended, over individual wave-form conversion and synchronisation-pattern inserting devides WC, to the corresponding outgoing local links ALL(O), BLL(O), CLL(O) and DLL(O). These multiplexer outputs are also applied to "IDLE signalling character" detectors AIDL, BIDL, CIDL and DIDL individually. An additional IDLE signalling character detector, DID, is provided in common to up to 24 highways of group DOH1 to DOHX and for this purpose the 1.536 Mb/s multiplexer OIM is interposed between those highways and the detector. Accordingly all the IDLE signalling character detectors, whose functions are to be described later, are identical.

The junction multiplexer JM requires special consideration in so far as it is concerned with relating 16 outgoing highways (embracing typically all categories)

with the sixteen 60 Kb/s multiplexed channels of the outgoing junction link JL(O), which are allocated to circuit-switched junction traffic. Accordingly only input leads one to 16 of the multiplexer JM are employed, and the relevant output of the multiplexer is extended, over the appropriate wave-form conversion and synchronisation pattern inserting device WC, to the outgoing junction link JL(O). The multiplexer output is also applied to an IDLE signalling character detector JID which is similar to others already mentioned. It is to be noted that an outgoing packet interface equipment, such as OPI, which is associated with the common control equipment CCE and the message packet store MPS is provided for the handling of outgoing junction information packets. These packets are duly to be inserted, into the high-speed channel of the 1.536 Mb/s multiplex on the outgoing junction link JL(O), by way of the outgoing high-speed channel equipment OHE.

THE SWITCHING AREA

The switching area of the data-switching exchange, which is controlled by control equipment SACE, comprises an array of sections of incoming crosspoint switches AIC, BIC, CIC and DIC, an array of sections of outgoing cross-point switches AOC, BOC, COC and DOC, and three groups of so-called cords ACD1 to ACDN, BCD1 to BCDN and CCD1 to CCDN. All the crosspoint switches are of the electronic high-speed type. The groups of cords are concerned with A category (750 b/s), B category (3 Kb/s) and C category (12 Kb/s) working respectively, and the number of cords in each group is determined by traffic considerations; the number of cords of each category being considerably less than the number of before-mentioned pairs of (incoming and outgoing) highways for the particular category of woring. No cords are provided in respect of D category working as no time-slot changing is required in the case of 60 Kb/s bit-stream messages.

Each croSspoint of the two arrays is symbolised by X, and it can be deduced that the array section AIC, which appertains to cords ACD1 to ACDN, enables incoming highways of group AIH1 to AIHN and other incoming highways emanating from the group of packet dissembly buffers PDBA to be selectively connected to the inputs of those cords. Likewise the corresponding array section AOC enables outgoing highways of group AOH1 to AOHN and other outgoing highways serving a group of message heading registers MHRA and a group of packet assembly buffers PABA to be selectively connected to the outputs of cords ACD1 to ACDN. Other corresponding sections, BIC/BOC and CIC/COC, of the two crosspoint arrays are likewise related to the groups of cords BCD1 to BCDN and CCD1 to CCDN respectively and to groups of message heading registers MHRB/MHRC, packet assembly buffers PABB/PABC and packet dissembly buffers PDBB/PDBC.

The two crosspoint array sections DIC and DOC provide for direct selective connection by way of so-called busses DB1 to DBN between the incoming highways DIH1 to DIHX and (i) the outgoing highways DOH1 to DOHX, (ii) a group of message heading registers MHRD, and (iii) a group of packet assembly buffers PABD; and between a group of packet dissembly buffers PDBD and the outgoing highways DOH1 to DOHX.

Each cord is used to provide the time-switching function necessary to align the 60 Kb/s multiplex appearance times of the channels dedicated to the subscribers' stations or junction paths involved in a duplex circuit-switched call. Each cord comprises a plurality of pairs of cord locations, the actual number of pairs of locations in each cord being determined on a traffic basis by the number of calls which are to be concurrently handled by the cord. Each cord location also includes information for the control of the relevant cross-points (both incoming and outgoing) thereby providing the space-switching function necessary for the interconnection of the 60 Kb/s multiplexes serving the subscribers' stations or junction paths involved in a call. The actual operation of the cords when handling circuit-switched calls will be described later with reference to FIGS. 11*a* and 11*b* and 11*c*.

CALL PROCESSING BY THE EXCHANGE

1. Subscribers' Stations Quiescent

All subscribers' stations which are in the quiescent state (i.e., idle and switched-on) are the subject of a CLEAR-CLEAR signalling-character interchange with the exchange. The CLEAR signalling characters which are transmitted by such a station are received at the exchange in the relevant channel of the appropriate local link whence they are extended to the corresponding signalling character detector; ASDL, BSDL, CSDL or DSDL respectively for category A, B, C or D stations. The CLEAR signalling characters directed to the station emanate from the signalling character generator SCG and are switched, by the high-speed crosspoint array SCCA, to that outgoing highway involving the particular station, at the recurring channel-appearance time-slot pertinent to that station. The outgoing CLEAR signals are advanced, over the appropriate multiplexer (ALM, BLM, CLM or DLM) and a particular wave-form conversion and synchronisation pattern insertion device WC, to the particular outgoing link where they appear in the channel effectively dedicated to the station.

With CLEAR signals incoming to the exchange from each station which is in the quiescent state, each corresponding storage buffer in the call-phase register apparatus is appropriately conditioned. At this juncture the station-state map of central control equipment will have those storage locations appertaining to quiescent stations in the "free" state.

2. Local Circuit-switched Call

The processing of a call between two identical local subscribers' stations, in respect of which packet-switching is not requested, will now be described. It will be assumed that the stations are in category A (750 b/s). When one of the subscribers' stations initiates a call it causes the CLEAR signal outgoing from it to be replaced by the repeated RS (request-for-service) signal.

Caller to Message Heading Register Connection

Upon confirmed reception of the RS signal by the signalling character detector ADSL, the new state of the subscriber's station will be communicated to the relevant call-phase storage buffer in the call-phase register arrangement CPRA. The change-of-state of the buffer together with its identity is promptly passed over path INT to the common control equipment so that the relevant storage location in the station-state map is changed to busy. Moreover the central control equipment CCE interprets the identity of said buffer to determine the incoming highway and outgoing highway accommodating the channel appropriate to the caller, and to determine the actual channel (i.e., the same channel-slot time in each case) thereof. Additionally the control equipment selects, by consulting its "message-heading register free" file, an idle one of the group of message heading registers MHRA which are collectively available to A category callers. Assuming that there are 80 message heading registers in the group, these are given individual cyclic character-slot appearances in the highway HHA, constituting a 60 Kb/s multiplex. Highway HHA is selectively connectable to the output paths of cords ACD1 to ACDN by crosspoint array section AOC. It can be deduced that each message heading register of the particular group has a specific channel-slot time at which it can accept a character. The identities of the selected heading register and the caller's station will be written at this time, by equipment CCE, into an "allocated heading register" file.

The situation now is that the common control equipment is aware of (a) the identity of the calling station and therefore of its incoming highway appearance (say time-slot 40 on highway AIHX) and (b) of the identity of the allocated heading register and the outgoing highway appearance (say time-slot 80) appertaining to it. To cater for the temporal displacement of said appearances it is necessary to interpose one of the group of cords ACD1 to ACDN. Accordingly the common control equipment now enters a "cord location selection" routine whereby it consults its "cord-state" file and nominates a cord, for example ACD1, and a pair of storage locations, say X and Y, therein for use on the "caller to heading register" connection. These cord locations will then be marked as busy in the cord-state file. At this stage the common control equipment is effective upon the crosspoint array SCCA to return the PS (proceed-to-select) signal to the caller, in place of the CLEAR signal by connecting it to highway AOHX at time-slot 40. The calling station responds by disabling the RS signal and by proceeding to transmit the heading section of the message.

In the interim, the common control equipment CCE forms the control information for each of the cord storage locations X and Y. The information formed for location X will be the crosspoint control information defining that crosspoint, i.e., CP1, of array section AIC which is relevant to the caller's incoming highway AIHN and the selected cord ACD1. The information formed for location Y will be, i) the crosspoint information defining that crosspoint, i.e., CP2, of array section AOC which is relevant to highway HHA (serving the group of the 80 heading registers MHRA) and said cord, and ii) a time-switching address of the partner location of the pair, i.e., cord location X. The relevant information is communicated to the two cord locations concerned by way of the switching area control equipment SACE. The equipment CCE also instructs the switching area control equipment duly to access location X at the incoming highway appearance times of the caller (time-slot 40) and to access location Y at the appearance times (time-slot 80) of the selected heading register.

At this juncture it will suffice to say that each message heading character duly forthcoming from the caller over highway AIHX at a time-slot 40 will be passed into the data area of cord location X (cord ACD1) by way of crosspoint CP1 activated (at time-slot 40) by the crosspoint information in that cord location; and at time-slot 80, crosspoint CP2 will be activated by the crosspoint information in location Y, and the character, currently stored in location X, will be extracted therefrom, under control of the time-switching address information (defining location X) in location Y. The extracted character is extended at this time, i.e., time-slot 80, to the selected message heading register which is responsive at time-slot 80. Thus communication from the calling station to the selected message heading register is established on the basis, in the present example, that each heading character occurring at a time-slot 40 in highway AIHX is thereupon stored in the cord at location X and released to the heading register at the next occurring time-slot 80. In the drawing (FIG. 3) the bracketted numbers associated with crosspoints CP1 and CP2 are significant of the time slots at which the crosspoints close in respect of the particular calling station to heading register connection.

The details of the foregoing 1-way communication procedure will be more readily understood when the functions of a cord are described, with reference to FIGS. 11*a*, 11*b* and 11*c* in respect of the 2-way interchange procedure of the eventually established interstation communication.

The situation now is that with the PS (proceed-to-select) signal being repetitively transmitted to the caller, the message heading section is forthcoming, character-by-character, from the caller. The heading comprises (a) class-of-service information (i.e., digit characters), (b) address of the called station (i.e., digit characters) and (c) the EOH (end-of-heading) signal. The chosen heading register is responsive to the characters of the heading which are duly accumulated therein. It is to be noted that the message heading register is conditioned to ignore interposed "filler" characters which would occur in the case of the caller's station having a data terminal equipment operating at other than the upper fundamental data-rate of its category.

When the repetitive EOH signal is duly received by the heading register it is effective in de-sensitising that register in respect of other characters which it may receive. The EOH signal is also received, and subjected to confirmation by the signalling character detector ASDL, and the call-phase storage buffer corresponding to the calling station (in arrangement CPRA) is thereupon updated. The call-phase register arrangement now promptly informs the common control equipment CCE, over path INT, that an end-of-heading condition has occurred in respect of the unique call-phase storage buffer.

The identity of the particular storage buffer is thereupon interpreted by the common control equipment CCE in terms of the calling station's incoming channel location, i.e., highway AIHX slot-time 40. The equipment CCE now refers to its allocated heading register file to determine the heading register concerned in the present call, and to demand transfer to the equipment CCE of the class-of-service and called-station address information. With the transfer complete, the message heading register is returned to its quiescent state and the identity of that register is returned to the message heading register free file. Within the control equipment CCE, the class-of-service information is assessed so that in the present instance it is determined that the call is to proceed on a circuit-switched basis. The class-of-service information is also assessed in relation to the called-station address to determine that access from the calling station to the particular called station is not barred. Moreover the central control equipment consults its station-state map in accordance with the called-station address information to determine whether the called station is busy or free.

Called Station Busy

If the called station is busy, the control equipment consults the called station's call-phase storage buffer in arrangement CPRA to find out the reason for the station being classed as busy, i.e., (a) station engaged on other call, or (b) station switched-off or faulty or channel faulty. In the first eventuality the control equipment instructs the signalling character generator SCG to connect the CTE (called-terminal-engaged) signal to the caller's outgoing channel in place of signal PS. In the second eventuality the control equipment causes the generator SCG to transmit the CTU (called-terminal-unobtainable) signal to the caller. In both of the above cases the control equipment also instructs the switching area control equipment to terminate the accessing of locations X and Y in cord ACD1. The addresses of cord locations X and Y will at this point be marked in the cord state file as now being free. When the caller duly responds to the repetitive CTE or CTU signal by clearing-down, the calling station reverts to repetitive transmission of the CLEAR signal, and the confirmed reception of this signal by the caller's call-phase storage buffer causes the station-state storage map in equipment CCE to be up-dated. Also as a consequence of the reception of said CLEAR signal, equipment CCE so controls generator SCG to replace the CTE or CTU signals by repetitive CLEAR signals. The caller's station, now in its quiescent state, is accordingly again involved in the CLEAR-CLEAR signal interchange with the exchange.

Called Station Free

If the called station is not busy, the called-station address characters are interpreted by the common control equipment in terms of that station's channel appearance times (say channel-slot time 60), in a particular incoming highway, and the related outgoing highway (say AIH1 and AOH1 respectively).

Continuing on the assumption that the called station is free, the central control equipment now, causes (a) the station-state map to be marked "busy" at the called station's location therein, and (b) the signalling character generator to be instructed to connect the CALLING signal to highway AOH1 in slot-times 60. The CALLING signal is therefore extended to the "return" path of the called station and this will duly result in the transmission of the READY signal (in place of CLEAR) by the called station over its "go" path. Meanwhile the control equipment, through the intermediary of the switching area control equipment SACE, clears the previously employed pair of cord locations (X and Y/cord ACD1). Concurrently with this action the above mentioned locations (X and Y) will be marked as free in the cord-state file.

The situation now is that the control equipment CCE is aware of, (a) the identity of the calling station and therefore of its incoming (AIHX) and outgoing (AOHX) highway-appearances (time-slot 40 in each case), and of (b) the identity of the called station and therefore of its incoming (AIH1) and outgoing (AOH1) highway appearances (time-slot 60 in each case). Again it is necessary to interpose one of the group of cords ACD1 to ACDN for time-alignment purposes and accordingly the common control equipment enters a cord location selection routine similar to that employed in respect of the foregoing caller to heading register connection. However in the present case it will be assumed that two idle locations (any two) in cord ACDN are nominated, and for convenience these again are referred to as locations X and Y. Upon their nomination, the locations are marked as busy in the cord-state file.

The common control equipment CCE forms the control information for each of the chosen cord locations X and Y (cord ACDN) which are represented in FIGS. 11*a* to 11*c*. This information comprises:

a. for location X: the crosspoint control information for defining the crosspoints of array sections AIC and AOC which are relevant to the caller's incominG (AIHX) and outgoing (AOHX) highways and the chosen cord ACDN (i.e., crosspoints CP3 and CP4 respectively) together with a time-switching address pointing to location Y.

b. for location Y: the crosspoint control information for defining the crosspoints of array section AIC and AOC which are relevant to called stations incoming (AIH1) and outgoing (AOH1) highways and the chosen cord (i.e., crosspoints CP5 and CP6 respectively) together with the time-switching address pointing to location X.

This information is transferred to the two cord locations concerned by way of the switching area control equipment SACE.

Considering FIG. 11*a* in particular, each of the typical cord locations X and Y comprises three storage sections TSA, D and CPI for time-switching address information, data and crosspoint control information respectively.

The four items of the information transferred by equipment SACE to these cord locations are accommodated as follows:

as regards location X: section TSA takes the time-switching address for enabling location X to define location Y, and section CPI takes the information for controlling crosspoints CP3 and CP 4 currently relevant to the calling station's go and return paths.

as regards location Y: section TSA takes the time-switching address for enabling location Y to define location X, and section CPI takes the information for controlling crosspoints CP5 and CP6 currently relevent to the called station's go and return paths.

The two locations will remain dedicated to the present call throughout its duration to permit two-way interchange of information between the stations.

As can also be seen from FIG. 11*a*, the typical cord incorporates a character input register CIR and a character output register COR each capable of holding a 10-bit character. The first of these is arranged to receive a 10-bit highway character in serial form (ten 16.6 microsec. bits giving 166 micro-sec. per character) and to output that character in parallel form to the data section of any addressed cord location, whereas the character output register is operative in the converse manner.

At the time that the just-mentioned items of information are transferred to the cord locations, the situation is that the calling station is transmitting the repetitive EOH signal over its go path and receiving the repetitive PS signal over its return path, whereas the called station is transmitting the repetitive CLEAR signal over its go path and receiving the repetitive CALLING signal over its return path. The CALLING signal is duly effective at the called station in causing it to transmit the repetitive READY signal in place of CLEAR.

The READY signals transmitted over the called station's go path are received and subjected to confirmatory checking by the signalling character detector ASDL. Moreover each of those signals appears in the called station channel (i.e., channel 60) of incoming highway AIH1. Upon confirmed reception of the READY signal, detector ASDL appropriately up-dates the call-phase storage buffer appropriate to the called station. Thereupon the call-phase register arrangement CPRA promptly institutes a condition, at path INT to the common control equipment, whereby the latter is caused to instruct the switching area control equipment to proceed with the repetitive addressing of the cord locations (cord ACDN) of the present call, in addition to any addressing it may already be performing in respect of any existing calls.

Also as a result of the condition presented over path INT, the common control equipment is operative on the signalling character generator SCG to cause the PS signal to be removed from channel 40 of highway AOHX (calling station return path) preparatory to advancement, over the cord, of the READY signals already emanating over the go path of called station.

The advancement of the above-mentioned READY signals to the calling station requires an appreciation of time-switching functions performed by the typical cord and these will be described with reference to FIGS. **11*b* and 11*c***.

Cord Operation

The time-switching functions of the particular cord will now be described with reference to FIG. **11*b* and 11*c*, the first of which shows, in respect of the present call, the state of the cord ACDN during a time-slot 40 (calling station channel) whereas the second shows the state of the same cord during a time-slot 60** (called station channel).

The addressing of the cord locations is under the control of the switching area control equipment SACE and this equipment is arranged to have a list of cord location address pointers for each cord of the switching area. The cord locatiOn address pointers for each cord are operative in a cyclic order such that the required address pointer will be used to access the corresponding cord location at the slot-time relevant to the part of the connection to which the cord location relates. Hence at time-slot 40, equipment SACE produces a pointer PA (in FIG. **11*b*) which causes location X to be accessed, whereas at time slot 60 equipment SACE produces a pointer PB (FIG. 11*c***) which causes location Y to be accessed.

Considering now FIGS. **11*b* and 11*c* in more detail in relation to the circuit-switched call. At time-slot 40, pointer PA accesses location X and the crosspoint information CPI (CP3/CP4) is extracted from this location, together with the time-switching address information TSA(Y). The time-switching address information is used to access cord location Y while the crosspoint information is used to close crosspoints CP3 and CP4. The accessing of cord location Y, as a result of the times-switching address in location X, causes the character currently stored in the data section of this location to be extracted and placed in the output register COR. It will be seen later that this character will have been placed in the cord location Y at the end of the time-slot relevant to that of the called station (i.e., preceding time-slot 60**).

The above-mentioned access to cord location X followed by the consequent access to cord location Y occurs at the start of time-slot 40 which of course is relevant to the calling station. The operation of crosspoint CP3 as shown in FIG. **11*b*** allows the incoming character on incoming highway AIHX to be fed in serial form into the input register CIR. At the same time the character extracted from cord location Y is fed out, over highway AOHX to the calling station.

At the end of time-slot 40, the contents of the cord input register CIR will be written into the data section of cord location X. In FIG. **11*b* the character received is referenced DCQR and this reference has been chosen to indicate that the character is passing from the calling station, which conveniently is defined for the description of FIGS. 11*b* and 11*c*** as station Q, to the called station, which is defined as station R.

When time-slot 60 is encountered, equipment SACE produces a pointer PB (FIG. **11*c*) to access location Y. The crosspoint information CPI(CP5/CP6) is extracted from this location Y together with the time-switching address information TSA(X). The time-switching address information is used to access cord location X while the cross-point information is used to close crosspoints CP5 and CP6. The accessing of cord location X, as a result of the time-switching address in location Y, causes the character currently stored in the data section thereof to be extracted and placed in the output register COR. The character DCQR of course is that which was received in the previous time-slot 40** from the calling station Q of the call.

The operation of crosspoint CP5 allows the character DCRQ from the called station on the incoming highway AIH1 to be fed serially into the input register CIR while the operation of crosspoint CP6 allows the character DCQR, received in location X at time slot 40 from the calling station, to be fed serially out, over outgoing highway AOH1 to the called station.

At the end of time-slot 60, the contents of the input register CIR (i.e., character DCRQ) will be written into the data section of cord location Y and it will remain therein until the next time-slot 40 occurs whereat the operations depicted in FIG. 11b will be repeated.

From the above it can be seen that three access functions within the cord are required for each time-slot involved. The first function, under the control of a pointer from equipment SACE, allows the crosspoint information for the time-slot to be extracted; the second function, under the control of the time-switching address information, allows the stored character from the data section of the partner location to be extracted and passed over an outgoing highway to a subscriber's station; whereas the third function, again at the location accessed by the pointer from equipment SACE, allows the incoming character to be stored in the data section of the originally accessed location.

It will be appreciated that each of the cords of the exchange is operable in appropriate circumstances in the manner described to enable 2-way transmission to be effected.

The situation appertaining to the typical local circuit-switched call is that at the exchange the confirmed reception of the READY signal from the called station has initiated the cord operation. Therefore, at the next-occurring time-slot 60, crosspoints CP5 and CP6 are closed allowing the READY signalling character from the called station to be written into the data section of location Y. Location X will also be accessed in this time-slot by way of the time-switching address in location Y; however as no character has yet been received by location X no character will be passed over highway AOH1. It should be noted that, at this time, the CALLING signal is still being connected to highway AOH1, and thence to the called station, by generator SCG in time-slot 60; the relevant operated crosspoint of array SCCA rendering the closure of crosspoint CP6 ineffective.

At the following time-slot 40, equipment SACE accesses location X to allow crosspoints CP3 and CP4 to be closed. The time-switching address extracted from location X allows the READY signal stored in the data section of location Y to be extracted for passage over highway AOHX to the calling station, while the EOH (end-of-heading) signal from the calling station will be stored in the data section of location X.

The calling station duly responds to reception of the READY signal by transmitting READY signals in place of EOH signals.

The confirmed reception of these READY signals by the signalling character detector ASDL of the exchange is operative on the call-phase register arrangement CPRA and control equipment CCE in a similar manner to previously confirmed signalling characters and, as a result, the common control equipment instructs generator SCG to terminate transmission of the CALLING signals to the called station. At this juncture (time-slot 40) a READY signal from the calling station, and now evident in the cord incoming register CIR, is placed in the data section of location X whereas the READY signal received from called station at the preceeding time-slot 60 is transmitted, from location Y via the character output register COR, to the calling station. At the ensuing time-slot 60, the READY signal stored in location X is transmitted to the called station (in place of the now removed CALLING signal); the READY signal now forthcoming from the go path of called station being extended to location Y.

The situation now is that a READY-READY signal interchange is taking place between the stations by way of the employed cord. Eventually the called station responds by substituting the IDLE signal at its go path and this is extended over the cord to the calling station and to the idle signalling character detector AIDL of the exchange. The calling station responds by transmitting an IDLE signal in place of the READY signal. Moreover detector AIDL responds by up-dating the call-phase storage buffer appropriate to calling station and this signifies to the control equipment CCE that half the transmission path, i.e., called-to-calling direction involving location Y, is fully operational. At the following time-slot 40, the IDLE signal transmitted by the calling station is passed to storage location X, and at the ensuing time-slot 60, this signal iS advanced by the cord 4o the called station and at the same time the idle character signalling detector AIDL responds. The latter up-dates the call-phase storage buffer of the called station and this is effective over arrangement CPRA to signify to equipment CCE that the other half of the transmission path, i.e., calling-to-called direction involving location X, is fully operational.

It is to be noted that if either of the call-phase storage buffers were not activated as described within a predetermined time, a call "time-out" procedure would be allowed to mature in the central control equipment CCE so as to permit initiation of a second attempt to set up the call.

The situation is that either station may now proceed with the transmission of data to the other, by way of the cord, according to the requirements of the particular call, and indeed data messages may be handled in opposite directions successively.

Clear-down At the end of message interchange, the data-transmitting station reverts to transmission of CLEAR signals. These signals are received by detector ASDL and by the other station. The latter station responds by transmitting CLEAR signals which are also received by detector ASDL. Both CLEAR signal transmissions are subjected to confirmation by the relevant call-phase storage buffers, whereupon the station-state map locations revert to the free states. Furthermore the central control equipment CCE advises the switching area control equipment SACE to cease accessing the particular cord locations (X and Y) which are now marked free in the cord-state file of equipment CCE. Also equipment CCE now controls the signalling character generator SGE in such manner that CLEAR signals are connected to the two stations over highways AOHX and AOH1 at time-slots 40 and 60 as appropriate. Thus the two stations, now both in the quiescent state, are accordingly again involved in the CLEAR-CLEAR signal interchange with the exchange.

Category B or C Circuit-Switched Local Calls Identical stations, in category B or C, requiring circuit-switched interconnection are handled in substantially the same manner as the circuit-switched call for A-category stations described above. However, in the case of a category B call, one of cords BCD1 to BCDN is employed of the establishment of the intitial caller to message heading register connection. This connection involves the relevant one of incoming highways BIH1 to BIHX and the highway HHB which serves the group of twenty heading registers MHRB on a t.d.m. basis. It is to be noted that if traffic conditions so warrant it, one or more additional highways, such as HHB, each with its attendant group of twenty heading registers, may be made accessible from the particular cords.

In the case of a category C call, one of cords CCD1 to CCDN is imployed in the message heading register connection from one of incoming highways CIH1 to CIHX to the highway HHC which serves the group of five heading registers MHRC on a t.d.m. basis. Again if traffic conditions so require, one or more additional highways, such as HHC, may be made accessible from the particular cords.

In either of these kinds of circuit-switched calls the ultimate station-to-station intercommunication is provided by way of one of the appropriate groups of cords (BCD1 to BCDN or CCD1 to CCDN) as the case may be, and the particular cord employed functions in a similar manner to that described with reference to a category A switched call. The eventual clear-down of the call is also performed in a like manner to that described.

The signalling character interplay occurring at various stages in the progress and eventual clear-down of the call follows the lines already described.

Category D Circuit-Switched Local Calls As already mentioned certain ones of incoming highways DIH1 to DIHX and corresponding ones of outgoing highways DOH1 to DOHX are permanently dedicated to individual local subscribers' stations operating at network rates of 60 Kb/s. Likewise highway HHD is dedicated to a single message heading register MHRD for use on D-category calls. In practice more than one such heading register would be provided and the highway of each of them would have appearances in the crosspoint array section DOC. Direct physical connections, i.e., so-called "busses" DB1 to DBN, are provided between crosspoint array sections DIC and DOC, in place of cords, since no slot-time changing is required. Since no cords are provided, the control of array sections DIC and DOC is exercised directly by the switching area control equipment SACE. Accordingly for the duration of the initial caller to heading register connection, the appropriate crosspoint in each of arrays DIC and DOC are closed, and likewise, on the eventual inter-station connection, crosspoints appertaining to both the calling and called station in each array section DIC and DOC are sustained operated.

3. Junction Circuit-Switched Calls

Outgoing Junction Call (Circuit-Switched) It will be assumed that a station served by data-switching exchange 1DSE (FIG. 1) is to set up a call to a station served by exchange 2DSE. Again considering FIGS. 2, 3, 4 and 5; when the call is initiated, the caller takes into use a message heading register of the appropriate category in the manner already outlined, and the central control equipment CCE is duly enabled to determine from the message heading that the call is destined for a particular station of exchange 2DSE, and that message-packeting is not to be employed. The central control equipment now forms a so-called "call-request" signalling packet which incorporates the called station's address in respect of the remote exchange. The call-request signalling packet is advanced by way of an outgoing packet interface equipment OPI and the high-speed channel equipment OHE to the high-speed channel of the outgoing junction link JL(O) extending to exchange 2 DSE, and is employed at that exchange to determine whether the called station is free to receive a call or not.

Assuming that the called station is free, the result is that exchange 2 DSE, by using a "junction channel-state" map, selects from the various groups of incoming and outgoing inter-exchange channels, one incoming and one outgoing channel of that group (circuit-switched usage) appropriate to the data-rate of the stations. Thus a particular outgoing channel of outgoing junction link JL(0) and the corresponding incoming channel of incoming junction link JL(I) (outgoing and incoming with respect to exchange 1DSE) are selected. The junction channel-state map is marked busy at the locations coresponding to the selected channels and an appropriate "proceed" signalling packet containing the identity of the selected channels is extended over the high-speed channel of junction link JL(I) to the incoming high-speed channel equipment IHE of exchange 1DSE. The proceed signalling packet, containing the identity of the particular pair of junction channels, is advanced to control equipment CCE by way of an incoming packet interface equipment IPI. More particularly the identity of the pair of junction channels would be specified by, (a) the identity of the pair of junction links if more than one pair were available, (b) the identity of the particular 60 Kb/s multiplex (1 of 16) comprising or containing the channel (same incoming and outgoing channel-times for category A, B or C working), and (c) in cases other than a call involving category D stations, the channel number (1 of 80, 1 of 20 or 1 of 5 for calls involving category A, B or C stations respectively).

This information, together with information already containing in the control equipment CCE (exchange 1DSE), enables that equipment to initiate setting up of a 2-way connection between the caller and the selected incoming and outgoing junction channels over the switching area; the connection involving a suitable cord in the case of category A, B or C working or a direct bus connection in the case of category D.

At this stage the caller's station is transmitting EOH (end-of-heading) signals and receiving PS (proceed-to-select) signals from exchange 1DSE, whereas the called station is receiving CALLING signals from exchange 2DSE and is transmitting CLEAR signals. The CALLING signals applied to the called station cause that station to respond with transmissIon of READY signals and these are cOmmunicated over the utilIsed incoming channel of exchange 1DSE where they are detected by the junction signalling character detector JSD. The latter causes the call-phase register buffer appropriate to that incoming junction channel to be up-dated accordingly, and the call-phase register arrangement CPRA promptly informs equipment CCE of the situation. Equipment CCE responds by instructing the character signalling generator SCG to remove the above-mentioned PS signal, so that the READY signals originated at the called station are extended to the calling station. The calling station responds by transmitting READY signals and these are communicating via the switching area of exchange 1DSE to exchange 2DSE over the outgoing junction channel. As an eventual consequence of this (i.e., transmission of READY by the calling station) the called station will respond by transmitting the IDLE signal. This signal, besides being extended to the calling station, is detected by one of the idle signalling character detectors AIDL to DIDL or DID of exchange 1DSE according to the station category. Such detection of the IDLE signalling character confirms the effectiveness of the called-to-calling direction of transmission so far as the switching area of exchange 1DSE is concerned. The IDLE signal meantime received by the calling station results in transmission of the IDLE signal from that station. This signal, extended over the switching area of exchange 1DSE, is detected by the junction idle signalling character detector JID thereby confirming the effectiveness of the calling-to-called direction of transmission as far as the switching area of exchange 1DSE is concerned. The IDLE signal from the calling station is moreover extended to the called station and the situation now is that an IDLE-IDLE signalling interchange is established between the two stations and transmission of data may duly take place.

Incoming Junction Call (Circuit-Switched)

The exchange 1DSE depicted in FIGS. 2, 3, 4 and 5 is advised of the initiation of a junction call incoming from exchange 2DSE by the reception of a call-request signalling packet extended by way of the high-speed (480 Kb/s) channel of the incoming junction link JL(O) to the high-speed channel equipment IHE. The packet, incorporating the called station's address, is advanced, by way of the incoming packet interface equipment, to the central control equipment CCE which consults the station-state map to determine whether the called station is free to accept a call. Assuming that the called station is free, the relevant location in the map is marked busy. The control equipment now institutes a search of the junction channel-state map incorporated therein to choose a pair of junction channels (incoming and outgoing) from those accommodated by links JL(I) and JL(O); the channels chosen being appropriate to the particular category (A, B, C or D) of the two stations and having the same appearance times in the case of A, B, or C category working.

The equipment CCE forms the proceed signalling packet containing the identity of the chosen pair of channels and this signalling packet is transmitted over the outgoing packet interface equipment OPI and the outgoing high-speed channel equipment OHE, to the calling exchange. At this time, the control equipment is effective in that (a) the junction channel-state mapis up-dated, (b) generator SCG is instructed to apply CALLING signals to the called station, and (c) a 2-way connection involving the switching area is initiated. The called station duly returns READY signals and these are detected by the appropriate signalling character detector ASDL to DSDL or DSD to up-date the appropriate call-phase storage buffer of arrangement CPRA.

The READY signals are extended over the switching area to the particular outgoing junction channel and thence to the calling exchange. Ultimately a READY signal, transmitted by the calling station is received on the particular incoming junction channel and this is extended to junction signalling character detector JSD. The relevant junction-channel storage buffer is updated, and equipment CCE, advised accordingly, now causes generator SCG to terminate transmission of the CALLING signal to the called station. The READY signals, incoming over the junction channel, are extended to the called station and, as a result of this, the previously described IDLE-IDLE signalling character interchange is instituted preparatory to communication of data between the stations.

Clear-Down of Junction Calls Either station participating in a junction call may initiate clear-down of the connection by reverting to the transmission of CLEAR signals. These are detected at the local exchange so that its central control equipment, (a) up-dates the station-state map to indicate that the station is free, (b) re-institutes the CLEAR-CLEAR signalling interchange between the cleared station and its exchange, (c) terminates the function of the switching area as regards the particular call, (d) compiles a so-called "clear-down" signalling packet, and (e) applies repetitive CLEAR signals to the particular outgoing junction channel. It should be noted that the junction channels will not be marked as free, in the junction channel-state map, at this stage.

The clear-down signalling packet contains the identity of the junction channels hitherto employed on the call, and is effective, over the high-speed channel, to cause the central control equipment of the remote exchange to connect CLEAR signals, (a) to the second station of the call and (b) to the particular outgoing channel of that exchange. The central control equipment of the last-mentioned exchange also terminates the pertinent function of its switching area. When said second station responds with transmission of CLEAR signals, these are detected and therefore control equipment (i) up-dates the station-state map, (ii) forms a so-called "release-guard" signalling packet, and (iii) marks the previously used junction channels as idle in the junction channel-state map. The release-guard signalling packet is now sent to the other exchange, over the high-speed channel and is effective in the control equipment thereof to mark the pertinent junction channels as idle in the related junction channel-state map.

It is to be noted that pairs of incoming and outgoing junction channels which are in their quiescent states are involved in a CLEAR-CLEAR signal interchange between the exchanges for monitoring purposes. Accordingly the two channels which have just been cleared-down are now in this condition.

Transit Calls It will be appreciated that calls between stations on different terminal exchanges may be routed over one or more exchanges of the general kind depicted in FIGS. 2, 3, 4 and 5 and adapted, by the provision of appropriate junction links, to function in a transit capacity. In such circumstances the allocation of junction channel pairs would be initiated firstly by the exchange serving the called station and successively by the transit exchange(s) in order from that exchange. As before the eventual clear-down of the call may be instituted by either station and as a result of this the exchange serving the clearing station generates a clear-down signalling packet which is passed to the next exchange along the line. The reception of the signalling packet at the last-mentioned exchange causes that exchange to generate a further appropriate clear-down signalling packet, and so on until a final such packet is received at the other terminal exchange. During the course of passage of the signalling packets, the switched path at the successive exchanges is broken down. At said other terminal exchange, the particular station is cleared as before and the release-guard packet developed so that a succession of such packets is developed backwardly between the exchanges successively. Consequently up-dating of the junction channel-station map at each exchange takes place.

4. Packet-Switched Calls

The data-switching exchange depicted in FIGS. 2, 3, 4 and 5 provides message-packet switching in respect of, (a) calls between stations operative at different data-rates, (b) calls requiring delayed message-delivery, and (c) calls requiring data to be transmitted to a plurality of other stations (i.e., multi-address calls).

The concept of message-packet switching, which is a particular form of store-and-forward working, involves the accumulation of one or more packets of information in arbitrarily accessible areas of a central store (message packet store) to enable each constituent packet of a possibly very extensive message to be retransmitted as a separate entity; the packets being nominally of the same size in that each of them is limited to a particular number of characters, say 128. The use of packets of this relatively small size order is particularly advantageous in the case of store-and-forward working involving junction links because by the use of high-speed channels (480 Kb/s), incorporated in those links, each completed packet is transmittable thereover within a period 0.5 ms. regardless of the data-rates of the subscribers'stations involved. As a result of the low occupancy period of each packet, the high-speed channel can handle many un-related message packets efficiently on a time-sharing basis.

For message-packet switching purposes, the exchange incorporates a message packet store MPS which is accessible from several groups of packet-assembly buffers PABA, PABB, PABC and PABD, (FIG. 2) and gives access to several groups of packet-dissembly buffers PDBA, PDBB, PDBC and PDBD (FIG. 4). As regards the assembly buffers, it may be taken that 80 forming group PABA (used for category A working) are served, in t.d.m. manner, by highway PAHA; that twenty forming group PABB (category B working) are likewise served by highway PAHB; that five forming group PABC (category C working) are likewise served by highway PAHC; and that the group of buffers PABD (category D working) are served individually by a highway such as PAHD. Highways PAHA, PAHB and PAHC are rendered accessible from the groups of cords ACD1 to ACDN, BCD1 to BCDN and CCD1 to CCDN respectively by appropriate crosspoints of array sections AOC, BOC AND COC respectively, and likewise highways such as PAHD are rendered accessible from the busses DB1 to DBN by crosspoints of array section DOC. The groups of dissembly buffers PDBA, PDBB, PDBC and PDBD (for A, B, C and D category working respectively) are organised as regards their highways PDHA, PDHB, PDHC and PDHD, in a corresponding manner to the assembly buffers, in that they are permitted access to cord groups ACD1 to ACDN, BCD1 to BCDN, CCD1 to CCDN and to busses DB1 to DBN over array sections AIC, BIC, CIC and DIC respectively.

Also as regards meeting message packeting requirements, but particularly in respect of junction calls, the exchange is additionally provided with so-called incoming packet-interface and outgoing packet-interface equipments IPI and OPI respectively; each being relevant to a junction link (incoming or outgoing) incorporating a high-speed channel. Incoming equipment IPI is connected to the high-speed channel equipment IHE of the incoming junction JL(I) and is provided with data paths to the message packet store MPS and the common control equipment; whereas the outgoing equipment OPI has data input paths from the store and the common control equipment, and is connected to the high-speed channel of the outgoing junction link JL(O) over equipment OHE.

A packet-switched call between local stations, i.e., stations within the region served by the exchange, may be considered as proceeding, in some cases, in the same manner as a circuit-switched call to the stage when the message heading information is transferred from the particular message heading register to the common control equipment. The latter is already aware of the identity of the calling station and the fact that EOH (end-of-heading) signals are emanating from it. In the cases mentioned, the class-of-service information of the message heading will be such as to determine that the call is required to proceed on a packet-switched basis. For a packet-switched call a separate packet area of the message packet store is required to be effectively connected to each station to cater for packet switching on a store-and-forward basis in each direction between the stations.

At this stage when the common control equipment has received the message heading of a packet-switched call, it consults the station-state map to determine whether the wanted station is free or busy. If that station is busy, and assuming that the class-of-service information indicates that delayed delivery is not to be resorted to, the common control equipment instructs the signalling character generator SCG to connect the before-mentioned CTE (called-terminal-engaged) signal to the caller and as a result of this the clear-down procedure becomes operative.

On the other hand, if the wanted station is indicated as free, the common control equipment causes generator SCG to apply CALLING signals to the called station and this is acknowledged by the return of READY signals to the signalling character detector serving the incoming link upon which the called station appears. The detector advises the common control equipment accordingly, and this causes the generator SCG to connect READY signals (in place of PS signals) to the calling station and these will duly be acknowledged by transmission of READY signals in place of EOH signals.

Packet Assembly The central control equipment, upon the detection of READY signals from the called station, consults its so-called "packet-assembly-buffer-state" file for the purpose of selecting (a) a first packet-assembly buffer of a group, PABA, PABB, PABC or PABD, appropriate to the working category, A, B, C, or D respectively, of the calling station and (b) a second packet-assembly buffer appropriate to the working category of the called station.

As regards the first packet-assembly buffer selected for use by the calling station, its identity, together with the identity of the calling station, is written into a so-called "allocated assembly buffer" file of the central control equipment CCE. Equipment CCE also selects a packet area of the message packet store for use by the calling station, and effectively renders the particular area inaccessible to other calls. Additionally, the control equipment places at least the called station's address portion of the message heading into the first part of the selected packet area together with calling stations address. Another effect of the control equipment at this stage, is that it ensures that message information duly to be forthcoming from the first packet-assembly buffer is directed to the appropriated area of the message packet store.

It should be noted that all packet areas are of the same size, typically 128 characters, and each message may use one or more such areas according to its size.

In the case of it having been determined that the calling station is of category A, B or C working, the control equipment consults its "cord-state" file to select a first cord, in the appropriate group, having two free locations (X1 and Y1). The control equipment is aware of the identities of the calling station and the nominated first packet-assembly buffer in terms of their channel times. The control equipment now forms and applies the following information to the two locations:

X1 — the identity of the crosspoint appropriate to the incoming highway (upon which the calling station's channel appears) and to the selected first cord, Y1 — firstly, the identity of the crosspoint appropriate to the selected first cord and to the outgoing highway (upon which the channel of the first nominated packet-assembly buffer appears) and secondly the time switching address defining location X1.

As regards the second packet-assembly buffer selected for use by the called station, a procedure which is identical to that first described is performed, but this of course involves the selection of a different packet area of store MPS for use by the called station, and the selection of a pair of free locations (X2 and Y2) of another (second) cord appropriate to the working category (conveniently A, B or C) of the called station. In this respect the control equipment forms and applies the following information to locations X2 and Y2:

X2 — the identity of the crosspoint appropriate to the incoming highway (upon which the called station's channel appears) and to the selected second cord, Y2 — firstly, the identity of the cross-point appropriate to the selected second cord and to the outgoing highway (upon which the channel of the nominated second packet-assembly buffer appears) and secondly the time-switching address defining location X2.

It follows from the foregoing that the two stations of the packet-switched call may be in the same or different working categories.

At this juncture, the signalling character generator SCG has already substituted transmission of the PS (proceed-to-select) signal by transmission of READY signals to the calling station, and that station is responding by transmission of READY signals in place of the EOH (end-of-heading) signals. Continuing with the assumption that the caller is category A, B or C, and that the called station is category A, B or C, the READY signals, upon being validly detected by the appropriate signalling character detector ASDL, BSDL or CSDL, are effective upon the control equipment CCE through the intermediary of the call-phase register arrangement CPRA. Accordingly equipment CCE responds by instructing generator SCG to return READY signals to the called station in place of CALLING signals. Moreover equipment CCE initiates the repetitive sequential accessing by equipment SACE of locations X2 and Y2 of the second cord to establish the required "called station to packet-assembly buffer" time-aligned connection. Thus after the manner of cord-connections already described, the switching area control equipment SACE accesses the second cord at location X2 at the channel appearance times of the called station and accesses location Y2 at the channel appearance times of the nominated second packet-assembly buffer.

As a result of the READY signals being received by the called station, that station duly transmits an IDLE signal. The IDLE signals from the called station extending over the second cord and relevant crosspoints of the switching area are operative upon the second packet-assembly buffer to instruct the control equipment CCE that the establishment of the called station to packet-assembly buffer connection is confirmed.

The last mentioned instruction received by the common control equipment causes that equipment to instruct the generator SCG to return IDLE signals to the calling station in place of READY signals, so that the said station will duly return IDLE signals to the exchange in place of READY signals. Meanwhile the common control equipment institutes repetitive sequential accessing of the first cord locations X1 and Y1 to establish the calling station to first packet-assembly buffer time-aligned connection. The IDLE signals, forthcoming from the calling station and extended by way of that portion of the switching area involving the first cord, are detected by the first packet-assembly buffer as confirmation of the establishment of the last-mentioned connection. The response of said buffer causes the common control equipment to instruct generator SCG to connect IDLE signals to the called station in place of READY signals.

The situation now is that each station is transmitting and receiving IDLE signals, and the calling station now proceeds with message transmission. Assuming that this message exceeds the residual storage capacity of the selected packet area associated with the first packet-assembly buffer, this area is filled by an initial portion of the message. The filled state of said area may be detected in several ways, but the outcome is that the control equipment is caused to allocate another packet area and to provide the filled area with a linking address defining the newly allocated packet area. The identity of the latter is communicated to the first packet-assembly buffer, by the control equipment CCE, so that further data characters of the message will be directed into the newly allocated packet area. This procedure will be repeated for each packet of the message.

A corresponding message-packet procedure involving the second packet-assembly buffer, will be instituted, as may be necessary, for any message forthcoming from the called station.

FIG. 10 depicts, in outline, a typical packet-assembly buffer PAB and packet-dissembly buffer PDB in relation to the message-packet store MPS. The packet-assembly buffer includes a character-input staticiser CIS, a character monitor CM, a four character word-assembly buffer WAB and a word-input buffer WIB which serves a word input path of the message packet store. The assembly buffer is provided with a 2-input AND gate GIC interposed between the particular packet-assembly highway PAH and the character-input store CIS; the second input of gate being connected to a clock-pulse source TCN which renders the gate active at the channel appearance times of the buffer PAB in highway PAH. A group of eight 3-input AND gates such as GICT is provided for the transfer of characters, in parallel form, from staticiser CIS to the word-assembly buffer WAB; the transfer function excluding the two administrative bits of the 10-bit characters received. Gates GICT are operatively controlled at their second input leads according to the condition of the character monitor CM while at their third input leads they are controlled by the assembly buffer control device ABC connected to the common control equipment over path AC.

As regards the packet-dissembly buffer PDB, this includes a word-output buffer WOB served by an output path of the message packet store MPS, a four-character word-dissembly buffer WDB, and a character-output shift register COSR. The buffer WDB and register COSR have a group of eight 4-input OR gates such as GOCT interposed between them. A 2-input AND gate GOC is interposed between the output lead of register COSR and the packet-dissembly highway PDH; the second input lead of the gate being connected to a clock-pulse source TCM which renders the gate active at the channel appearance times of the packet-dissembly buffer PDB in highway PDH. The packet-dissembly buffer also incorporates a control device DBC which is associated with the output register COSR; the device being connected to the common control equipment over path DC.

Considering the packet assembly function typically in respect of the calling station; the first character forthcoming at the packet-assembly highway PAH, in the channel appropriate to the nominated packet-assembly buffer PAD, is an IDLE signalling character emanating from the calling station. This character received in serial form is staticised in device CIS and is concurrently presented to the transfer gates GICT and the character monitor CM. Since the present character is representative of the IDLE signal, and accordingly is not to be assembled into the stored message packet, the character monitor maintains inhibition of gates GICT so that tranfer to the word-assembly buffer is prevented. Reception of the IDLE signalling character by the monitor CM is also effective in communication of the nature of the signal to the exchange common control equipment over lead SCD. The condition on lead SCD informs the control equipment that the caller to packet-assembly buffer connection has been established. The exchange common control equipment now instructs the nominated packet-assembly buffer, over lead AC, to perform its assembly functions. The assembly buffer control device ABC, therefore, primes all the transfer gates GICT.

Reception of the data characters forming the message now proceeds and these are passed, each in parallel form, sequentially to the four character segments of the word-assembly buffer WAB. Each time the latter has its full complement of four characters, the resultant 32-bit word is transferred to the work-input buffer WIB, leaving buffer WAB available to continue its assembly function. It is to be noted that any filler characters which may be forthcoming to the packet-assembly buffer, during the course of the message, are so constituted as to be detected by the character monitor and in each case the latter is operative to prevent transfer of the filler character to the assembly buffer WAB.

Upon a word being entered into buffer WIB, a demand is presented over the "input-transfer-request" lead ITR to the message packet store MPS. The latter thereupon calls for transfer of the word to the already-designated packet area. Compilation of the message on ia word-by-word basis within the message packet store, using one or more packet areas as required, proceeds in the manner outlined. When the calling station has completed transmission of the message (possibly the first of a series of message) it reverts to transmission of IDLE signals, which are detected by the character monitor CM. The monitor prevents transfer of the IDLE signals to the word-assembly buffer WAB and advises the common control equipment over lead SCD that these signals have been received. The control equipment responds by applying a control signal to the assembly buffer control device ABC by way of path AC. Thereupon device ABC disables transfer gates GICT and conditions the word-assembly buffer WAB, so that if the latter happens to have less than a full word in it, the contents of that buffer will be transferred to the word-input buffer for transmission to the message packet store.

The common control equipment records, in relation to the called station, the identity of each packet area which is employed by the caller so that re-transmission of the packets forming the message may be handled, a packet at a time by appropriate packet dissembly equipment of the exchange. Re-transmisssion of the message may commence at any time after the first packetting function has been performed. Moreover from this point, accumulation and re-transmission of different packets of the particular message may proceed concurrently.

Packet Dissembly The common control equipment in consulting its record of all packet areas containing messages to be re-transmitted is duly operative, with respect to the first packet area of the message from the particular calling station, to extract from it the message heading, and to use the network address portion appertaining to the called station to set up a connection between the first packet area and the called station by way of a packet-dissembly buffer.

The control equipment causes, (i) a packet-dissembly buffer of the working category (A, B or C) appropriate to the called station to be selected, and ii) the cord information, appropriate to the called station and the selected packet-dissembly buffer, to be formed. Item (i) above involves the association of the first packet area in store MPS with the selected dissembly buffer whereas item (ii) involves selection of a cord, having two idle cord locations X and Y, in the group ACD1 to ACDN, BCD1 to BCDN or CCD1 to CCDN appropriate to the called station's working category. The information now passed by the control equipment to the two cord location is:

X —identity of the crosspoint appropriate to the incoming highway, (upon which the selected packet-dissembly buffer appears) and the selected cord Y —firstly the identity of the crosspoint appropriate to the selected cord and outgoing highway upon which the called station's channel appears, and secondly the time-switching address defining location X.

At this juncture the common control equipment cause transmission of IDLE signals to the called station to terminated, and, through the interdediary of the switching area control equipment SACE, causes activation of the last-selected cord in respect of the time-aligning function required for the packet-dissembly buffer to called station connection; the pertinent crosspoints of the switching area also being activated.

Reverting to the representation of the packet-dissembly buffer PDB shown in FIG. 10; the common control equipment applies a condition over lead DC to the control device DBC and at the same time inhibits transmission of IDLE signals to the called station from generator SCG. Control device DBC is now effective in two ways. Firstly it permits gate GOTR to pass signal over the "output-transfer-request" lead OTR to the message packet store MPS. The last-mentioned signal is generated due to the word-output buffer WOB being empty, and indeed this signal will be generated at all those times, during the subsequent message-transmission function, when buffer WOB is empty. Secondly the device DBC is effective in inserting an IDLE signalling character into the character output shift register COSR for transmission at the channel appearance time of the packet-dissembly buffer. This IDLE signal will be passed over the cord, ahead of the transmission of the message proper to the called station. The IDLE signalling character will be detected by the appropriate idle signalling character detector (AIDL, BIDL or CIDL) as it is passed to the called station. The detection of the IDLE signalling character informs the exchange common control equipment that the connection is effective.

Meanwhile, the "outgoing-transfer-request" signal received by the message packet store MPS over lead OTR is utilised to institute word-by-word extraction of the particular message packet from the store. When the first word has been transferred, in parallel manner, to the word-output buffer WOB it is immediately transferred to the empty four character word-dissembly buffer WDB. With buffer WOB now empty, gate GOTR is again activated causing the second word of the message packet to be transferred to buffer WOB.

After transmission of the before-mentioned IDLE signal, by shift-register COSR, to the called station, by way of packet-dissembly highway PDH, the now empty shift register calls for the transfer to it of the first character of the word stored in buffer WDB, and proceeds with the serial transmission thereof. After transmission of the first character, register COSR calls for the second character of the word and this is transmitted serially to the called station. The remaining characters of the word are dealt with in the same manner but when the fourth character has been removed from the word dissembly buffer WDB, the latter calls for transfer of the next word which is already evident in buffer WOB. With buffer WOB now empty, it activates gate GOTR whereby the next (third) word of the message packet is transferred to it.

It can now be deduced that the packet-dissembly buffer will be effective in transmitting all the characters of the message packet to the called station in the manner outlined. However, it may be that the characters of the message require to be interspersed with filler characters and for this purpose the device DBC, as instructed by the common control equipment, has the capability of injecting these at requisite points in the transmission sequence.

The common control equipment is enabled to deduce when the message packet transmission has been completed (i.e., buffers WOB and WDB and register COSR empty) and thereupon said control equipment dissociates the first packet area from the dissembly buffer so that the packet area will become available for general service.

In the normal course of events, a second packet area will have been filled or will eventually be filled, by the calling station and accordingly control equipment CCE, at the appropriate time, associates that area with the packet-dissembly buffer. Re-transmission of this packet thereupon proceeds in the manner described. Each packet of the message is handled on this basis, and if it happens that there are gaps between re-transmission of successive packets of the message (say due to the caller communicating with a higher-speed data-rate station) those gaps are filled by transmission of IDLE signals injected by the signalling character generator.

During or after re-transmission of the message originated by the calling station, the called station may commence transmission of its first message to the call originating station. The previously mentioned second packet-assembly buffer and the second cord with its nominated locations X2 and Y2 are involved in the packeting of the message forthcoming from the called station. The packeting procedure is identical to that employed in respect of the calling station, and packet dissembly and re-transmission is also accomplished after the manner described, but using a dissembly buffer and cord of those which are appropriate to the category of the calling station.

Any succeeding message forthcoming from either station would be handled in the same manner.

The intercommunication may be terminated at any time by either station clearing; the resultant transmission of CLEAR signals from the particular station initiating the clear-down procedure. It is to be noted that as a result of the clear-down process, the packet assembly and dissembly buffers are made available for use on other calls.

Local Packet-Switched Calls Involving Category D Stations In dealing with packeted local calls so far, it has been assumed that the calling and called stations have fallen within categories A, B and C necessitating the use of cords in respect of the initial message heading register connection and of the packeting connections. However, one or both of the stations may fall within category D, and the data switching exchange caters for this possibility.

Assuming that the caller is in category D, then call origination proceeds as for a circuit-switched call in that a connection is set up to a message heading register of group MHRD by way of switching-area array sections DIC and DOC and one of the so-called busses DB1 to DBN; a fully dedicated incoming highway (one of DIH1 to DIHX) and a fully dedicated outgoing highway (such as HHD) being utilised. The particular crosspoint of each of array sections DIC and DOC involved in the connection is controlled directly from the switching area control equipment SACE and these crosspoints remain closed throughout the period of this initial connection. The message heading accumulated by the heading register is transferred to the common control equipment CCE and used in the same manner as in the previous example. However since the caller is in category D (60 Kb/s), the control equipment determines that a connection is set up between the caller and one of the group of packet-assembly buffers PABD again by way of one of the busses. The packet assembly process within the message packet store MPS proceeds also as before. The particular crosspoint of each of array sections DIC and DOC involved in the caller to packet-assembly buffer connection is again controlled by equipment SACE and these crosspoints remain closed throughout the period of the packeting assembly process. It is to be noted with respect to FIG. 10 that the gating function offered by gate GIC is not required in D category packet-assembly buffers.

After the manner of the previously described packet dissembly and re-transmission function, the common control equipment initiates re-transmission of the packeted message at the rate appropriate to the category of the called station; a suitable cord being involved in the re-transmission path for a call to a category A, B or C station. As was described in the previous example, the data-switching exchange caters for message packeting in both directions between the two stations.

A message packeted call originated by any category (A, B, C or D) of calling station may be destined for a D category station served by the exchange. In this case, the common control equipment, allocates a packet-dissembly buffer in group PDBD. It is to be noted that with respect to FIG. 10, the gating frunction offered by gate GOC is not required in the D-category packet dissembly. When retransmission is required, one of the busses (DB1 to DBN) is chosen and a connection is established over it between the allocated dissembly buffer and that outgoing highway of group DOH1 to DOHX serving the called station. The connection involves sustained operation of crosspoints in array sections DIC and DOC under the direct control of equipment SACE.

As before the data switching exchange caters for two-directional packet-switched working, and the call is eventually cleared down after the manner already described.

It is to be noted that in the case of local packet-switched calls involving category D stations, as in the case of like calls involving the other categories of stations, each call is effective in a two directional manner. The whole process is performed in two separate stages for each transmission direction of the call in that firstly, the station transmitting a message is connected to message packet assembly and storage means, and secondly, a connection is provided to the station, to which the message is to be re-transmitted, from the storage means by way of packet dissembly means; the packet assembly and dissembly means in each direction being relevant to the working category of the message-transmitting and message-receiving station respectively.

Local Packet-Switched Calls (RS Signal Determined) On

On all local packet-switched calls already alluded to, the store-and-forward requirement was assumed to have been determined from the class-of-service portion of the message heading when the latter had been received by the message heading register. However some stations will always require that their calls to handled on a packet-switched basis. The status of the individual stations, in this respect, is recorded within the exchange central control equipment and this enables any station of this type to be assessed as such immediately it initiates a call, as evidenced by detection of RS (request-for-service) signals. Under these circumstances a connection is not set up to a message heading register but a connection is promptly established to a packet-assembly buffer in the group appropriate to calling station and the entire message, including the message heading, is assembled into a selected areas of the message packet store. Upon reception of the EOH (end-of-heading) signal by the packet-assembly buffer, the latter (over lead SCD of FIG. 10) informs the common control equipment appropriately. This allows the common control equipment to be cognizant of the message heading section of the first employed packet area to enable the control equipment duly to access that section for the purpose of deriving call-destination information. The routing of the call and re-transmission of the message (excluding the heading) is effected as already described.

Local Packet-Switched Calls in Other Circumstances

There may be a number of circumstances, other than those previously alluded to, under which packet-switching of calls is resorted to. Typically, certain stations have the facility whereby they are so classed that all calls originated by them are established on a circuit-switched basis providing the called station is free, but the store-and-forward facility is to be resorted to if that station is encountered busy; delivery of the message being effected when the called station becomes available. In this type of call, when the message heading has been received by the heading register, and the common control equipment by reference to the station-state map has determined that the called station is busy, the classification of the calling station, as permanently recorded in the control equipment, indicates that the call should not be abandoned but should continue on a store-and-forward basis. This is performed in two distinct stages in a unidirectional manner. Firstly, the caller is connected to a message packet-assembly buffer and thence to the message packet store where the entire message is accumulated whereupon the particular connection is cleared down. Secondly, when the wanted station becomes free, a connection is provided to it from the store by way of a packet-dissembly buffer whereupon the stored message is re-transmitted and then that connection is automatically cleared down.

Junction Packet-Switched Calls

The typical data-switching exchange described with reference to FIGS. 2 to 5 is represented as being connected to another such exchange by incoming and outgoing junction links JL(I) and JL(O) respectively. As mentioned previously a plurality of 60 Kb/s channels typically eight in each of these links are combined for use as a single high-speed (480 Kb/s) channel exclusively for the handling of information packets (both message and signalling) between the two exchanges.

Considering incoming junction link JL(I), this, besides being terminated upon a device WFCA, is connected to the incoming high-speed channel equipment IHE for extraction of the high-speed (480 Kb/s) channel which is extended to the incoming packet interface equipment IPI. Similarly the outgoing junction link JL(O), besides being terminated upon a device WC, is connected to the outgoing high-speed channel equipment OHE for insertion of the high-speed channel information derived from outgoing packet interface equipment OPI. Equipments IPI and OPI are associated with the common control equipment CCE and the message packet store MPS.

As regards an outgoing junction call, when the message heading received from the calling station has been transferred to the common control equipment CCE by the message heading register, a "call-request" signalling packet is compiled by the control equipment of the calling exchange. The call-request packet includes the addresses of the calling and called stations. The particular call-request packet, identified as requiring to be routed over the particular outgoing link JL(O), is placed in queue for handling, by way of the high-speed channel of that link, as and when the channel is made available to it. The traffic handling capacity of the high-speed channel is such that the delay in handling any packet placed in queue will not be in excess of a few milli-secs., the period of actual transmission being merely a fraction of a milli-sec. . Accordingly the call-request packet will duly be sent over the high-speed channel of junction link JL(O) by way of the outgoing packet interface equipment OPI and the outgoing high-speed channel equipment OHE.

At the remote (called) exchange (assuming it to be identical with that shown in FIGS. 2 to 5) the call-request packet received over the high-speed channel of incoming junction link JL(I) is routed, over incoming high-speed equipment IHE, to the incoming packet interface equipment IPI. This recognises that the present packet is a signalling packet, as distinct from a message packet, and therefore the packet is routed into the common control equipment of the called exchange.

As a result of receiving the call-request packet, equipment CCE (called exchange) consults its station-state map to determine whether the wanted station is busy or free.

In the first eventuality, the control equipment would form a "called-station busy" signalling packet which is transmitted with minimum delay, by way of the outgoing packet interface equimpment OPI and the outgoing high-speed channel equipment OHE, to the calling exchange over the high-speed channel of outgoing junction link JL(O). Consequent upon reception of the called-station busy packet by the common control equipment of the calling exchange (and in the absence of a delayed-delivery option) the CTE (called-terminal-engaged) signal is returned to the calling station by its local exchange and the call will be cleared down.

In the second eventuality, the common control equipment of the called exchange causes CALLING signals to be transmitted to the called station which, in accordance with a previously outlined procedure, duly returns IDLE signals to said exchange. As a result of this the common control equipment of the called exchange (i) sets up a path over the switching area between the called staion and an appropriate packet-assembly buffer, (ii) causes IDLE signals to be returned to the called station, in place of CALLING signals, from generator SCG and (iii) forms an "acknowledge" signalling packet The latter is transmitted over the high-speed channel of junction link JL(O) to the calling-exchange where it is received by the common control equipment through the intermediary of the incoming high-speed channel equipment IHE and the incoming packet interface equipment IPI.

The situation preparatory to reception of the acknowledge signalling packet by the calling exchange was that the called station (connected to a packet-assembly buffer) is transmitting and receiving IDLE signals; whereas the calling station is transmitting EOH (end-of-heading) signals and receiving PS (proceed-to-select) sognals from the generator SCG.

Upon reception of the before-mentioned acknowledge signalling packet by the calling exchange common control equipment, the latter causes READY signals to be transmitted to the calling station which responds by transmitting READY signals to the exchange. In the exchange, reception of the READY signals is effective upon the common control equipment in causing a switching-area connection to be established between the calling station and an appropriate packet-assembly buffer. Also following a previously described procedure, the common control equipment selects the first packet area of store MPS to be used by the calling station, and places, in that area, the message heading of the particular call. At this time the control equipment CCE causes IDLE signals to be passed to the calling station which responds by transmission of IDLE signals followed by the data of the message destined for the called station.

The processing of the two-directional packet-switched junction call is virtually the same as that of the previously-described local two-directional packet-switched call; the essential difference being that for each direction of transmission each separate packet of the relevant message is communicated, between the message packet stores of the two exchanges, by way of the high-speed channel of the relevant one of the pair of junction links. It is to be noted that each assembled packet is immediately placed in queue in respect of use of the relevant high-speed channel, but the traffic capacity of that channel is such that the packet will be sent within milli-secs. of completion of assembly. By inference the packet-assembly end of each message transmission will never require more than two packet storage areas to be in use concurrently.

Each packet transferred between the message packet stores of the two data-switching exchanges, will be duly dissembled and transmitted to the appropriate station at the requisite data-rate and in the correct order to reconstitute the original message; the latter functions being performed in the same manner as for a local packet-switched two-directional call.

Data-switching exchanges such as that depicted in FIGS. 2 to 5 may, by the provision of appropriate junction links, be used for transit calls requiring message-packeting. Accordingly an exchange working in a tandem or transit capacity provides for packeted message storage in its store MPS; the packets transferred over the high-speed channels of the appropriate links passing into and out of the store by way of packet interface equipments such as IPI and OPI respectively. Under these circumstances the switching area of the transit exchange is not used.

EXCHANGE CLOCKS

Before embarking on a detailed description of some of the equipments shown in FIGS. 2, 3, 4 and 5 it is convenient to consider the various exchange clocks which are necessary to synchronise the operation of the exchange. The clock equipments as such are not shown in any of the drawings as they would be of quite conventional design. Conveniently they would be located within the common control equipment CCE of FIG. 2.

For re-timing bit-streams and for identifying the communication channel to which any character envelope in a multiplexed bit-stream belongs, the following timing pulses are required in the exchange;

TA: Short pulses at 1.536 MHz (i.e., 0.65 uS repetition rate) for strobing bistable elements and driving shift registers at the line transmission rate in the multiplexers, de-multiplexers, signalling character detectors and cord input and output registers for example.

TB: Ten interleaved streams of pulses of 0.65 uS duration, defining the positions of the 10 successive bits in an envelope in the 1.536 Mb/s multiplexes for use in the frame-aligning and synchronisation pattern insertion sections of WCFA and WC respectively for example.

TC: Twenty-four interleaved streams of pulses of 6.5 uS duration, plus one of 10.4 uS, defining the positions of the envelopes belonging to each of the 24 multiplexed 60 Kb/s systems, plus 16 bits of synchronising information for use in the multiplexers and de-multiplexers for example.

CM: Pulses of 6.5 uS duration, whose temporal positions and repetition rates correspond to those of the envelopes comprising each particular communication channel. The number of different CM pulse streams equals the number of channels provided in a 1.563 Mb/s system. The CM pulses are used to control the distributors in the call-phase registers for example.

TG: Short pulses at 60 KHz, for strobing bistable elements and driving shift registers at the exchange processing rate for use in the multiplexers and demultiplexers for example.

TH: Ten interleaved streams of pulses of 16.67 uS duration, defining the positions of the ten successive bits in an envelope in the 60 Kb/s multiplexes for use in the signalling character generator for example.

CD: Pulses of 166.7 uS duration, whose temporal positions and repetition rates correspond to those of the envelopes comprising each particular communication channel. The number of different CD pulse streams equals the number of channels provided in a 60 Kb/s sub-system for use in the switching area control equipment for example.

Consideration will now be given to particular equipments required in the data-switching exchange.

SIGNALLING CHARACTER DETECTOR AND CALL-PHASE REGISTER

FIG. 7 shows a typical signalling character detector SD and a typical call-phase register CPR, the latter being part of the call-phase register apparatus CPRA of FIG. 2. The signalling character detector SD consists of a signalling character extractor SCE, a synchronisation checking circuit CS, a lost-synchronisation signalling character generator LSG, a character staticiser CSTAT, a character decoder CDEC, a character code gate CG and a character code comparator COMP. The call-phase register CPR consists of a storage block SB having a number of locations, such as SLX, each of which have provision for storing (I) a code defining the current call-phase, CCPR, (ii) a code persistence count, CCR and (iii) an unconfirmed-character code, UCR. Each location corresponds to a previously mentioned call-phase storage buffer. As mentioned previously it is likely that each local link will carry a 1.536 Mb/s multiplex which is dedicated to a particular bit-rate category and consequently the number of locations in a store block, such as SB, will depend upon the data-rate category of the multiplex it serves. In the case of a local link dedicated to A category stations using the 750 b/s data-rate (i.e., local link ALL(I) in FIG. 2) there will be 1,920 locations in the store block. In the case of a local link dedicated to B category stations using the 3 Kb/s data-rate (i.e., local link BLL(I) in FIG. 2) there will be 480 locations in the store block. In the case of a local link dedicated to C category stations using the 12 Kb/s data-rate (i.e., local link CLL(I) in FIG. 2) there will be 120 locations while local links dedicated to D category stations using 60 Kb/s data-rates (i.e., local link DLL), there will be 24 locations in the store block. The locations of the store block are cycled in sympathy with the appearances of the channels on the 1.536 Mb/s multiplex under the control of distributor D which is driven by CM pulses. The call-phase register CPR also includes a call-state buffer CSB which is used to generate an "interrupt" signal INT to the common control equipment CCE in FIG. 2.

The signalling character detector SD is used to detect in-band signalling as far as the local network is concerned. As mentioned previously each 10-bit character consists of eight data bits plus a synchronising bit and a signalling /data bit or so-called flag bit. This latter flag bit precedes the eight data bits and is arranged to be in the "flag set" state when the accompanying eight bits signify a signalling character (such as the request-for-service character) and to be in the "flag reset" state when the accompanying eight bits signify a data character. The signalling character extraction circuit SCE detects the flag set condition and, if the synchronisation checking circuit CS indicates "in synchronism" on lead INS, the following eight signalling character bits are passed to the character staticiser CSTAT. The eight-bit character appearing in the staticiser is decoded, in the character decoder CDEC, into a three-bit code and is passed to the storage block SB. The distributor D at this time will be addressing the location which corresponds to the particular channel in the 1.536 Mb/s multiplex and the contents of this location indicates the current state of the particular channel (i.e., particular subscriber's station).

The newly received signalling character is written into the unconfirmed code section UCR of the addressed storage location and if this is the first time this signalling character has been received no further action will be experienced.

Certain signals are transmitted repetitively so that errors may be combated by a persistence check (e.g., by checking that the same signalling character is received on say three consecutive appearances of the particular channel). For this purpose, the signalling character appearing in the staticiser CSTAT is decoded and passed to the character code comparator COMP. The comparator compares the character just staticised and decoded with the last character received on the same channel, whose code was stored in the unconfirmed character code section UCR. If the codes are equal, the code count in section CCR is incremented by one whereas if the codes do not agree the code count in section CCR is restored to zero. The current code count is also fed to a character code gate CG and this is used to open a path for the decoded character to be written into the current call-phase section CCPR of the addressed store block location. This operation has now indicated to the call-phase register CPR that a persistent signalling character has been received and this fact is used to generate an interrupt, on lead INT, to the central control equipment CCE of FIG. 2. The code of the actual signalling character persistently received is also passed to the call-state buffer CSB together with the current setting of the distributor D. Hence the interrupt condition to the common control complex may now be accompanied by information defining, (a) the multiplex involved (i.e., which CPR of the one-per-multiplex in the CPRA of FIG. 2), (b) the channel involved (by the setting between 1 to 1,920 for 750 b/s data-rate working, of distributor D); and (c) a code of the actual character (such as request-for-service) persistently received. This information collectively will allow the central control equipment (CCE FIG. 2) to handle the required operations called for by the generation of the signalling character, in respect of the particular station.

It was mentioned previously that the signalling character is only fed to the character staticiser CSTAT if the synchronisation checking circuit CS finds that synchronism has not been lost. When synchronism is lost, a signal is produced on lead SL to cause the lost signalling character generator LSG to produce repetitively a "synchronism lost" character. This character after decoding is effectively forced into the currently addressed storage location and will be used, subject to the persistence check, to create an interrupt to the common control equipment.

It must be pointed out that the character gate CG may pass the received character to the current call-phase section CCPR without using the persistence check provided by the code count section CCR arrangements by detecting that the character code is of a special non-persistent nature.

Finally consideration will now be given to the use of lead IDL shown in FIG. 7. During the final stages of setting up of a call it is necessary for the originating data switching exchange to check that a circuit exists between the stations of a circuit-switched call and more particularly from the called station's network terminal unit to the 1.536 Mb/s channel dedicated to the calling station. This is performed by checking for the presence of signalling IDLE characters originated by the called station's network terminal unit when that unit is set up ready for the data transfer operation to commence. The point of detection is on the 1.536 Mb/s multiplex outgoing from the data switching exchange on the channel dedicated to the calling subscriber. The idle signalling character detector, such as AIDI in FIG. 2, is used to inject an "idle returned" code into the requisite call-phase register location, overwriting effectively the character being produced by the calling network terminal unit at that time. The idle returned code is subjected to a persistence check and, when it is confirmed, the current call-phase section of the relevant location of the call-phase register is up-dated to show "call in progress." The common control complex CCE in FIG. 2 of course is also informed at that time allowing the call to continue as normal. Should the IDLE signal not be detected before a specified time has elapsed the common control equipment (CCE FIG. 2) will clear-down the selected path and set up a new path for the call.

DE-MULTIPLEXER

Referring now to FIG. 8 a description of the functions performed by a typical de-multiplexer for use in the data-switching exchange will be given. Each de-multiplexer consists of 24 pairs of 10-bit registers 1DRA and 1DRB to 24DRA and 24DRB, only the first and last of which are shown in FIG. 8 for ease of presentation. Each pair of registers, such as 1DRA and 1DRB, feeds a switching area input highway, such as IH(1) (by way of a gating field formed by gates G55, G56 and G57). Each de-multiplexer services one incoming 1.536 Mb/s multiplex and it is arranged to de-multiplex that incoming multiplex into its component twenty-four 60 Kb/s multiplex parts. It will be recalled that in the case of local links the 1.536 Mb/s multiplexes are likely to be dedicated to a subscriber data-rate category. Hence all the highways IH(1) to IH(24) emanating from the associated de-multiplexer in this case will carry 60 Kb/s multiplexes dedicated to the same data-rate and they therefore form part of the group of highways IH1 to IHX of a particular data-rate.

Each pair of registers, such as 1DRA and 1DRB, are individually used for channel (i.e., 10-bit character) reception on alternate 1.536 Mb/s multiplex frames, each channel being effectively delayed by one 1.536 Mb/s multiplex frame period. On alternate frames the register not being filled is used to output to the associated exchange input highway. The alternate frame control arrangements are provided by the toggle TD and the control gates GDWO, GDWE, GDRO and GDRE acting on the register control gates, such as G51 and G52 for register 1DRA and such as gates G53 and G54 for register 1DRB. It will be noted that gates G51 and G53 are also controlled by a lead TC1 and this lead is arranged to be activated for the full channel time (i.e. 6.5 uS) corresponding to channel 1 in each 1.536 Mb/s multiplex frame. Similarly each register pair in the de-multiplexer is primed by a different TC pulse.

The incoming 1.536 Mb/s multiplex, after wave-form changing and frame-aligning, is passed over lead WCF which is connected to the input paths of all the registers in the multiplexer. Hence the 10-bit character of channel one of each frame will be written into either register 1DRA or register 1DRB and the 10-bit characters in successive channels will be similarly handled in the other register pairs up to register 24DRA or register 24DRB for each frame.

The control toggle TD is driven as a binary divider by a set of "end of frame" pulses on lead EOF and consequently it provides odd DOL and even DEL output conditions to drive the control logic gates and to prime the required register output gates. The read control logic gates GDRE and GDRO are also driven by a source of pulses TG from a 60 KHz clock-pulse generator while the write control logic gates GDWE and GDWO are driven by a source of pulses TA from a 1.536 MHz clock-pulse generator. Hence for each frame of the 1.536 Mb/s multiplex, gates GDWO or GDWE will produce a stream of pulses at a repetition rate of 1.536 MHz, while gates GDRO or GDRE will produce a stream of pulses at a repetition rate of 60 KHz. Which gates of the pair are used on each frame of course depends upon the state (either odd DOL or even DEL) of the toggle TD.

All the gates shown in FIG. 8, and indeed in FIGS. 9 and 10, are of the so-called AND and OR types. Each AND gate, having a number 2 enclosed within the symbol, is arranged to produce a '1'state output when both its inputs are in the 1 state, while each OR gate, having a number 1 enclosed within the symbol, is arranged to produce a 1 state output when either of its inputs is in the 1 state.

It will now be assumed that, at the start of a particular frame of the 1.536 Mb/s multiplex, toggle TD is producing a 1 state condition on lead DOL and a 0 state condition on lead DEL (i.e., the following frame of the 1.536 Mb/s multiplex is a so-called "odd frame"). Hence gates GDWO and GDRO will be primed while the register output gates, such as G55, will also be primed.

When the above-mentioned odd frame commences, the first 6.5 *u* seconds thereof (i.e., the first channel of that frame) will be defined by a pulse of that duration on lead TC1. Hence the first ten TA pulses, from the 1.536 MHz pulse generator, produced by gate GDWO will be active via gates G51 and G52 on register 1DRA causing the first 10-bit character of the 1.536 Mb/s multiplex frame to be fed over lead WCF into that register. Subsequent characters will be fed into corresponding DRA registers in the de-multiplexer at corresponding TC2 to TC24 channel times. Hence in the odd frames, the 24 DRA registers are each filled successively with the 24 10-bit characters of the 1.536 Mb/s multiplex frame. During the odd frame, control gate GDRO is producing pulses at the 60 KHz rate and consequently the register control gates, such as G54, on the DRB registers are being driven at the 60 KHz rate. This action causes the 10-bit characters, which were received in the DRB registers in the immediately preceding even frame of the 1.536 Mb/s multiplex, to be fed out, effectively in parallel, a bit at a time, to the corresponding exchange input highways IH(1) to IH(24) via the output gates such as G55 and G56.

At the end of the current odd frame toggle TD will change its state causing a 1 state condition to be experienced on lead DEL with a 0 state condition on lead DOL. This will cause gates GDWE and GDRE to be primed to pass the TA(1.536 MHz) pulses and the TG (60 KHz) pulses respectively while the register output gates, such as G57, will be primed for the complete even frame. Hence the twenty-four 10-bit characters in the succeeding even frame will be fed into successive DRB registers, commencing at 1DRB and ending at 24DRB, in sympathy with the channel timing pulses TC1 to TC24. Concurrent with this operation, but of course at the slower rate, registers 1DRA to 24DRA filled in the odd frame, will be read out, concurrently a bit at a time to the exchange input highways IH(1) to IH(24).

From the above it can be seen that the effect of the de-multiplexer is to divide the 1.536 Mb/s multiplex up into its 24 component 60 Kb/s multiplexes and to apply each of those component 60 Kb/s multiplexes to a separate exchange input highway.

In the particular embodiment of the data-switching exchange each local link 1.536 Mb/s multiplex is dedicated to a particular subscriber data-rate category A, B, C or D. However in the case of junction links, such as JL(I) in FIG. 2, the multiplex will carry sixteen 60 Kb/s multiplexes each dedicated to circuit-switched inter-exchange traffic and eight 60 Kb/s multiplexes operated as a single (480 Kb/s) high-speed channel for information packet handling. When the 1.536 Mb/s multiplex has been de-multiplexed the switching area input highways IH(1) to IH(16) of FIG. 8 will be distributed amongst the corresponding data-rate input highway groups.

Typically five 60 Kb/s multiplexes may be dedicated to A category working, five multiplexes may be dedicated to B category working, four multiplexes to C category working and two multiplexes to D category working. This typical arrangement allows for a maximum of 400 category A working, 100 category B working, 20 category C working and two category D working circuit-switched calls to be carried by the junction link at any one time. The typical distribution of the above-mentioned category working multiplexes within the 16 multiplexes of each frame of the 1.536 Mb/s multiplex of course is quite arbitrary however it will be assumed that multiplexes one to five are dedicated to category A working, multiplexes six to 10 are dedicated to category B working, multiplexes 11 to 14 are dedicated to category C working and multiplexes 15 and 16 are dedicated to category D working. The 1.536 Mb/s bit-stream on the junction link, after wave-form conversion and frame-aligning, is applied to the junction de-multiplexer JD and this de-multiplexer provides 16 concurrent 60 Kb/s bit-streams each dedicated as typically defined above to one of the categories of working. It will be realised that of the 16 output leads from the de-multiplexer JD in the assumed case, leads one to five will carry 60 Kb/s bit-streams dedicated to category A working, leads six to 10 will carry 60 Kb/s bit-streams dedicated to category B working, leads 11 to 14 will carry 60 Kb/s bit-streams dedicated to category C working, and leads 15 and 16 will carry 60 Kb/s bit-streams dedicated to category D working.

It will now be realised that the group of incoming highways referred to as incoming highways AIH1 to AIHX for example actually consists, in the case of the assumed provisions of FIG. 2, of 29 highways, 24 connected to the 24 output leads of de-multiplexer ALD together with five connected to leads 1 to 5 of de-multiplexer JD.

MULTIPLEXER

Referring now to FIG. 9 a description of the operations of a multiplexer for use in the data-switching exchange will be given. The construction of the multiplexer is very similar to that of the de-multiplexer of FIG. 8. Again 24 pairs of 10-bit registers 1MRA and 1MRB to 24MRA and 24MRB are used, only the first and last being shown in FIG. 9 for ease of presentation. Additionally the register control gating such as gates G61 and G62 together with gates G63 and G64 and the control logic (toggle TM and gates GMWO, GMWE, GMRO and GMRE) are similar to those shown in FIG. 8. In the case of the multiplexer however each register pair is fed from a separate switching area output highway, such as OH(1) for register pair 1MRA and 1MRB, and the output from the register pairs are fed to a single 1.536 Mb/ multiplex output lead WC. Also at each frame, one register of each pair of registers is filled at the 60 KHz rate while the other register of the pair is read out to the output lead WC in the corresponding channel time at the 1.536 MHz rate.

At each odd frame toggle TM produces a 1 state condition on lead MOL causing gates GMWO and GMRO to produce 60 KHz pulses and 1.536 MHz pulses respectively. Hence corresponding characters on each of switching area output highways OH(1) to OH (24) are fed, a bit at a time concurrently into the MRB1 to MRB24 registers of the pairs at the 60 Kb/s rate under the control of gate GMWO, by way of gates such as G64. While the registers MRB1 to MRB24 are being filled with 10-bit characters, the characters fed into registers MRA in the preceding even frame are extracted, over gates such as G67 and G65 at the 1.536 MHz rate in the corresponding channel time, as defined by the TC pulse leads, under the control of the register control gates, such as G61, which in turn are controlled by the control logic gate GMRO. Hence at successive time slots (TC1 to TC24) the 10-bit characters are passed from the MRA registers to the lead WC by way of the output OR gates such as G65, the register output control AND gates, such as G67, being open for the corresponding channel time as defined by the associated TC lead such as TC1.

At the end of an odd frame, toggle TM will change its state producing a 1 state condition on lead MEL and a 0 state output on lead MOL. This causes gates GMWE and GMRE to pass 60 KHz and 1.536 MHz pulses respectively and the register output control gates, such as G65, to be primed ready for the corresponding TC pulse, such as TC1. Hence the corresponding character on each exchange output highway, OH(1) to OH(24), is fed, a bit at a time at the 60 KHz rate, into the corresponding MRA register while at the particular channel time the character received in the odd frame is extracted from the MRB register of the pair and fed to the outgoing 1.536 Mb/s multiplex on lead WC.

TYPICAL ALTERNATIVE FEATURES

All the foregoing description has been related to one embodiment only of the invention and it will be appreciated by those skilled in the art, that numerous variants are possible. For example the local links and junction links have been described as operating on a 1.536 Mb/s basis, however the use of 2.048 Mb/s data links is quite feasible allowing thirty-two 60 Kb/s multiplexes to be incorporated in each link. Data links other than those operating at 1.536 or 2.048 Mb/s may be used and indeed the bit rates of the four categories of stations and the number of such categories may arbitrarily be determined providing that having decided upon the bit-rate of the highest-speed category all the remaining categories are sub-multiples thereof. Obviously the number of 60 Kb/s multiplexes collectively employed as the high-speed channel of a junction link may be varied, for example 12 such multiplexes may be used to provide a 720 Kb/s channel for packet working.

As far as the exchange highways of the particular embodiment of the data-switching exchange are concerned, these, and indeed the whole of the switching area, have the register output control gates, such as G65, to be primed ready for the corresponding TC pulse, such as TC1. Hence the corresponding character on each exchange output highway, OH(1) to OH(24), is fed, a bit at a time at the 60 KHz rate, into the corresponding MRA register while at the particular channel time the character received in the odd frame is extracted from the MRB register of the pair and fed to the outgoing 1.536 Mb/s multiplex on lead WC.

TYPICAL ALTERNATIVE FEATURES

All the foregoing description has been related to one embodiment only of the invention and it will be appreciated by those skilled in the art, that numerous variants are possible. For example the local links and junction links have been described as operating on a 1.536 Mb/s basis, however the use of 2.048 Mb/s data links is quite feasible allowing 32 60 Kb/s multiplexes to be incorporated in each link. Data links other than those operating at 1.536 or 2.048 Mb/s may be used and indeed the bit rates of the four categories of stations and the number of such categories may arbitrarily be determined providing that having decided upon the bit-rate of the highest-speed category all the remaining categories are sub-multiples thereof. Obviously the number of 60 Kb/s multiplexes collectively employed as the high-speed channel of a junction link may be varied, for example twelve such multiplexes may be used to provide a 720 Kb/s channel for packet working.

As far as the exchange highways of the particular embodiment of the data-switching exchange are concerned, these, and indeed the whole of the switching area, have been demonstrated as being operative on a 60 Kb/s basis with each channel spanning 10 bits. However it may be convenient to discard the synchronisation bit before it enters the switching area and to re-insert it, as may be required, at the outgoing side of the switching area. Under these circumstances, with appropriate modification of the exchange de-multiplexers and multiplexers, the switching area, including the highways, would be operative at 54 Kb/s. In this respect each channel has the same duration as for the 60 Kb/s case but spans nine bits instead of 10.

By modification of the exchange multiplexing and de-multiplexing arrangements, the switching of each interleaved character may be effected on a parallel basis by use of the multi-conductor highways and multi-"make" crosspoints in the switching area, in place of single conductor highways and single-make crosspoints.

As represented in the particular exchange embodiment the message heading registers, packet-assembly buffers and packet-dissembly buffers used on A, B or C category working require connections involving the use of time-slot changing cords of the switching area. However, it is possible for these devices (i.e., registers and buffers) to be directly connectable to the switching area highways by providing either (i) discrete crosspoints serving individual-device highways or (ii) input and output gating facilities within them which may be selectively made sensitive to any required time-slot appearance rather than the dedicated appearance arrangement which has been described. Under such circumstances it is necessary for the crosspoints controlling the direct connections to be controlled by the switching area control equipment at the required times. The direct connections referred to would be analagous to the busses DB1 to DBN as far as heading register and assembly or dissembly buffer connections are concerned except of course that they will be time-slot controlled in addition.

In FIG. 4 of the data switching exchange, a group of message heading registers and a group of packet-assembly buffers is represented as being provided for each working category of stations. However the functions of each type of equipment is largely the same and accordingly slight modification of the packet-assembly buffers would enable them to perform a dual function permitting the separate message heading registers to be dispensed with.

Also in the embodiment described each station connected to the exchange is provided with a discrete incoming and outgoing channel appearance in the incoming and outgoing highways, or fully occupies an individual highway of the switching area, as applicable. However traffic circumstances may dictate that concentration of channels of the local (1.536 Mb/s) links will be advantageous by permitting channels to be arbitrarily allocated on calls. In such circumstances it is necessary for the second-stage multiplexers to be additionally provided with (i) separate channel signalling arrangements for communication with the data-switching exchange, (ii) signalling character detection arrangements and (iii) signalling character generator arrangements. The second-stage multiplexers in this case would be responsible for the quiescent CLEAR-CLEAR signal interchange and the detection of RS (request-for-service) signals. Upon detection of RS signals, the corresponding second-stage multiplexer would generate a separate channel call-request message which would be used by the common control equipment to allocate local-link channels of the appropriate category to the calling station. The call-phase register arrangement in this case would be informed of the identity of the calling station. The common control equipment would then send a proceed packet back to the corresponding second-stage multiplexer which effectively associates the calling station's channels on the primary link with the allocated pair of local-link channels. The call set-up procedure would then continue in the manner described except that the exchange common control equipment will have the responsibility of selecting the channels with which the wanted station is to be associated, and of informing the second-stage multiplexer of the channels selected before connecting CALLING signals to the selected exchange outgoing channel.

Another variant to the arrangements of the typical data-switching exchange disclosed in the drawings is that a form of concentration may be employed in respect of local links and pertinent switching area highways. Accordingly it is contemplated that concentration-switching means might well be interposed between the output leads of the local de-multiplexers and incoming highways of the switching area; with the use of counter-part expansion-switching means between outgoing highways of the switching area and the input leads of the local multiplexers.

As already described the typical data-switching exchange caters for category D stations (60 Kb/s local to the exchange, which are connected to it by pairs of direct links ADL(I)/ADL(O) to NDL(I)/NDL(O). Other categories of local stations may also be catered for, and in this event appropriate de-multiplexing and multiplexing arrangements are inter-posed between the relevant incoming and outgoing links and the switching area; some adaptation of the input/output area of the exchange being required in respect of the pertinent signalling character and idle signalling character detectors.

It is appreciated that a data-switching exchange must be able to handle data message traffic generated by computer installations operating on a time-sharing basis for example as a so-called bureaux. In such circumstances the computer installation is arranged to generate a message consisting of a number of separate message packets each of which is required to be routed over the data network to a different subscriber's station; these stations being the time-sharing terminals of the bureaux. The data-switching exchange described may be adapted to accommodate such time-sharing installations by providing a number of selectable incoming packet interface equipments, such as IPI in FIG. 2, to which the category D working station of the bureaux may be connected. This allows the already assembled interleaved-packet message, each packet being separated by an EOP (end-of-packet) signalling character, to be fed directly (by-passing the switching area) into the message packet store MPS for subsequent distribution to the time-sharing terminals using the standard packet-dissembly arrangements of the exchange. Similarly by the provision of selectable outgoing interface equipments, such as OPI in FIG. 4, packets incoming to the exchange serving a bureaux may be assembled (using the normal packet-assembly arrangement) into one interleaved packet message in store MPS, this message may then be transferred to the time-sharing computer's station using a single message transfer operation.

What we claim is:

1. A data switching exchange serving on a two-way transmission basis a plurality of digital subscribers' stations, said stations being segregated into a plurality of data rate categories according to their individual operational data-rates and said exchange comprises in combination:

a plurality of incoming and outgoing time division multiplex transmission highways arranged in pairs, each pair accommodating incoming and outgoing multiplexes respectively handling information in respect of the same plurality of subscribers' stations on a character interleaved basis in the same synchronous multiplex time-slot appearance order there being at least one pair of highways for each data-rate category and each individual highway handles information in respect of one data-rate category only, a plurality of time switching cords arranged in groups, there being one group of cords dedicated to each data-rate category and each cord has an input path and an outpt path and includes a plurality of cord locations, each cord location when in use provides temporary storage for message data characters in transit and semi-permanent information stored for the duration of each call handled by the cord location, a message packet store containing a plurality of packet areas for the storage of assembled message packets, a plurality of packet-assembly buffers served by packet-assembly highways and connected to said message packet store, there being at least one packet-assembly highway for each data-rate category and each packet-assembly buffer is served exclusively or on a time division multiplex basis by one packet-assembly highway and said packet-assembly buffer includes means for accepting and temporarily storing data characters forthcoming over the related packet-assembly highway preparatory to communication to a predetermined packet area of said message packet store for the assembly therein of a message packet, a plurality of packet-dissembly buffers served by packet-dissembly highways and connected to said message packet store there being at least one packet-dissembly highway for each data-rate category and each packet-dissembly buffer is served exclusively or on a time-division multiplex basis by one packet-dissembly highway and said packet-dissembly buffer includes means for transmitting each data character of an assembled message packet over the related packet-dissembly highway, a switching network segregated into sections there being one section for each data-rate category and each section comprises i. a first crosspoint array making selective connection to the input paths of any of the groups of cords dedicated to said particular category and ii. a second crosspoint array making selective connection to the output paths of any of said group of cords; said first crosspoint array includes a first rank of crosspoint switches, providing selective connection between each incoming highway serving subscribers' stations of the particular category and said input paths, and a second rank of crosspoint switches, providing selective connection between each packet dissembly highway of said particular category and said input paths whereas said second crosspoint array includes a third rank of crosspoint switches providing selective connection between each outgoing highway of said particular category and said output paths and a fourth rank of crosspoint switches providing selective connection between each packet assembly highway of said particular category and said output paths and common control means operable to condition said semi-permanent information of a cord location with information indicative of a. the identities of the crosspoints in said first and third ranks serving the highways upon which two stations to be connected appear,
b. the identities of the crosspoints in said first and fourth ranks serving the highways upon which a station and a packet-assembly buffer to be connected appear or
c. the identities of the crosspoints in said second and third ranks serving the highways upon which a packet-dissembly buffer and a station to be connected appear.

2. A data-switching exchange according to claim 1 wherein the exchange also includes further pairs of highways individually dedicated to a single subscriber's station of a further data-rate category, and said switching network includes an additional section including a first crosspoint array upon which the incoming highways of the latter pairs are individually terminated, a second crosspoint array upon which the outgoing highways of the same pairs are individually terminated and a plurality of busses each accessible over said two arrays and circuit-switched inter-communication between two stations of the further data-rate category is effected solely by the selective operative of crosspoints of the additional arrays.

3. A data-switching exchange according to claim 1 wherein the exchange is served for two-way interexchange communication at data-rates corresponding to each of said data rates by at least one pair of junction links comprising an incoming junction link and an outgoing junction link carrying as appropriate an incoming or outgoing high bit-rate multiplex each accommodating at least one incoming or outgoing multiplex for each data-rate category and means are provided to demultiplex the incoming high bit-rate multiplexes according to their data-rate categories and those incoming and outgoing multiplexes are allocated to incoming and outgoing highways respectively of the appropriate date-rate categories, each of the last-mentioned incoming and outgoing highways being selectively served by first and third ranks of crosspoints of the appropriate switching network sections.

4. A data-switching exchange according to claim 1, wherein a plurality of message-heading registers are provided served by message-heading highways, there being at least one message-heading highway for each data-rate category and each message-heading register is served exclusively or on a time division multiplex basis by one message-heading highway and includes means for accumulating the message heading information from a subscriber's station originated call for passage to said common control means and each section of said switching network includes an additional crosspoint rank in the second array providing selective connection between each message-heading highway of said particular category and said output paths.

5. A data-switching exchange according to claim 1 wherein each packet-assembly buffer includes a staticiser of one data character capacity for acceptance of data characters forthcoming from the related packet-assembly highway at periods appropriate to the particular packet assembly buffer, work-assembly buffer having a plurality of character-storage sections, transfer means for successive transfer of characters in parallel form from said staticiser to the storage sections of the word-assembly buffer to form a message packet store word therein, a word-input buffer to which the word content of the word-assembly buffer is transferred in parallel form, said work-input buffer being operative when a word is stored therein to apply an input-transfer-request signal to the message packet store preparatory to the latter demanding transfer of the word content of the word-input buffer to the message packet store.

6. A data-switching exchange according to claim 5 wherein each packet-assembly buffer includes a character monitor for assessing each received character, said monitor being operative in respect of each of predetermined characters received to inhibit communication of such predetermined characters to the message packet store.

7. A data-switching exchange according to claim 6, wherein each packet-dissembly buffer includes a word-output buffer of one word capacity for storage of multi-character words derived in parallel form over a path from the message packet store, a word-dissembly buffer of one word capacity for storage of multi-character words derived in parallel form over a path from the word-output buffer, a character-transmitting device of one character capacity connected to the related packet-dissembly highway at periods appropriate to the particular packet-dissembly buffer, and transfer means for the successive transfer in aprallel form of characters from said word-dissembly buffer when activated to perform a packet-dissembly function being operative to enable the word-output buffer when empty to apply an output-transfer-request signal to the message packet store preparatory to the latter effecting transfer of a word of the stored message packet to the word-output buffer, the word accepted by the word-output buffer is transferred to the word-dissembly buffer when the latter is empty, and the characters of the word stored in the word-dissembly buffer are transferred one at a time and in parallel form to said character transmitting device which is operative to transmit any character transferred thereto to the related packet-dissembly highway at a period appropriate to the particular packet-assembly buffer.

8. A data-switching exchange according to claim 7 wherein each packet-dissembly buffer includes means for arbitrarily injecting "filler" characters into any transmitted message packet.

9. A data-switching exchange according to claim 7 wherein the lowest of the data-rates employed is a sub-multiple of each of the others.

10. A data-switching exchange according to claim 1 wherein one or more groups of said pairs of highways are provided for each data-rate category and the exchange is provided with at least one incoming local link for each data-rate category of subscribers' stations, each said incoming local link carries a high bit-rate multiplex accommodating a group of said incoming highway multiplexes in an interlaced manner and each said incoming local link is served by a link-connecting path terminated upon an appropriate multiplex-segregating means which supplies a corresponding group of incoming highways with pertinent incoming multiplexes.

11. A data-switching exchange according to claim 10 wherein each incoming junction link is served by a link connection path terminated upon an appropriate multiplex-segregating means which supplies at least one incoming highway of each data-rate category with its pertinent incoming multiplex.

12. A data-switching exchange according to claim 11 wherein each link-connecting path is also connected to a separate signalling-character detector for the detection of in-band "signalling" characters and each said signalling-character detector is associated with a call-phase register having a separate storage location for each subscriber's station or junction channel served by the particular link-connecting path, the storage locations of a call-phase register being sequentially addressed by a cyclic distributor in synchronism with the appearance of the subscribers' stations or junction channels on the related link-connecting path.

13. A data-switching exchange according to claim 12 and in which each said storage location includes a first section of one character capacity for storage of detected signalling characters, a second section for counting successive occurrences of identical signalling characters and a third section of one character capacity for storage of confirmed signalling characters derived as a result of said second section attaining a predetermined state-of-count.

* * * * *